United States Patent
Umakoshi et al.

(10) Patent No.: US 9,598,048 B2
(45) Date of Patent: Mar. 21, 2017

(54) WEBBING TAKE-UP DEVICE AND SEATBELT DEVICE

(71) Applicant: KABUSHIKI KAISHA TOKAI-RIKA-DENKI-SEISAKUSHO, Aichi-ken (JP)

(72) Inventors: Tomonari Umakoshi, Aichi-ken (JP); Masato Yatsuhashi, Aichi-ken (JP); Hisatoshi Ishikawa, Aichi-ken (JP); Yuya Nagata, Aichi-ken (JP); Takahiro Osaki, Aichi-ken (JP); Fumihito Komeno, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/049,794

(22) Filed: Feb. 22, 2016

(65) Prior Publication Data
US 2016/0244020 A1    Aug. 25, 2016

(30) Foreign Application Priority Data
Feb. 24, 2015  (JP) ................. 2015-034361

(51) Int. Cl.
*B60R 22/46* (2006.01)
*B60R 22/48* (2006.01)

(52) U.S. Cl.
CPC ...... *B60R 22/46* (2013.01); *B60R 2022/4666* (2013.01); *B60R 2022/4816* (2013.01)

(58) Field of Classification Search
CPC .................................................... B60R 22/46
See application file for complete search history.

(56) References Cited

U.S. PATENT DOCUMENTS 3,900,078 A * 8/1975 Otani ...................... B60R 22/06
280/804
4,564,218 A * 1/1986 Yokote ................... B60R 22/06
242/390.3

(Continued)

FOREIGN PATENT DOCUMENTS

| EP | 1731389 A1 | 12/2006 |
| EP | 2676851 A1 | 12/2013 |
| JP | 2007099257 A | 4/2007 |

OTHER PUBLICATIONS

Extended European Search Report for corresponding European Patent Application No. 16156834.0 dated Jun. 30, 2016.

*Primary Examiner* — Thomas Tarcza
*Assistant Examiner* — Alex C Dunn
(74) *Attorney, Agent, or Firm* — Roberts Mlotkowski Safran Cole & Calderon PC

(57) ABSTRACT

There is provided a webbing take-up device including (1) a take-up shaft, (2) an attachment and detachment detection unit, (3) a motor, (4) a first transmission unit that transmits rotation of the output shaft in a first direction to the take-up shaft, (5) a second transmission unit that transmits rotation of the output shaft in a second direction to the take-up shaft, and that also transmits the output torque of the output shaft to the take-up shaft such that the take-up torque of the take-up shaft does not reach a preset first torque, and (6) a control unit that, in cases in which engagement between a tongue and a buckle has been detected, controls a drive voltage and a drive current such that the output shaft rotates in the first direction, and the take-up torque of the take-up shaft reaches a second torque higher than the first torque.

6 Claims, 14 Drawing Sheets

(56) References Cited

U.S. PATENT DOCUMENTS

| | | | | |
|---|---|---|---|---|
| 4,936,600 A | * | 6/1990 | Kawai | B60R 22/41 |
| | | | | 280/804 |
| 5,709,408 A | * | 1/1998 | Carraway, Jr. | B60R 22/206 |
| | | | | 180/268 |
| 7,887,094 B2 | * | 2/2011 | Sakaida | B60N 2/4808 |
| | | | | 280/803 |
| 7,905,313 B2 | * | 3/2011 | Odate | B60R 21/0134 |
| | | | | 180/268 |
| 8,544,889 B2 | * | 10/2013 | Vincenzotti | B60R 22/06 |
| | | | | 280/804 |
| 2007/0040058 A1 | | 2/2007 | Koide | |

* cited by examiner

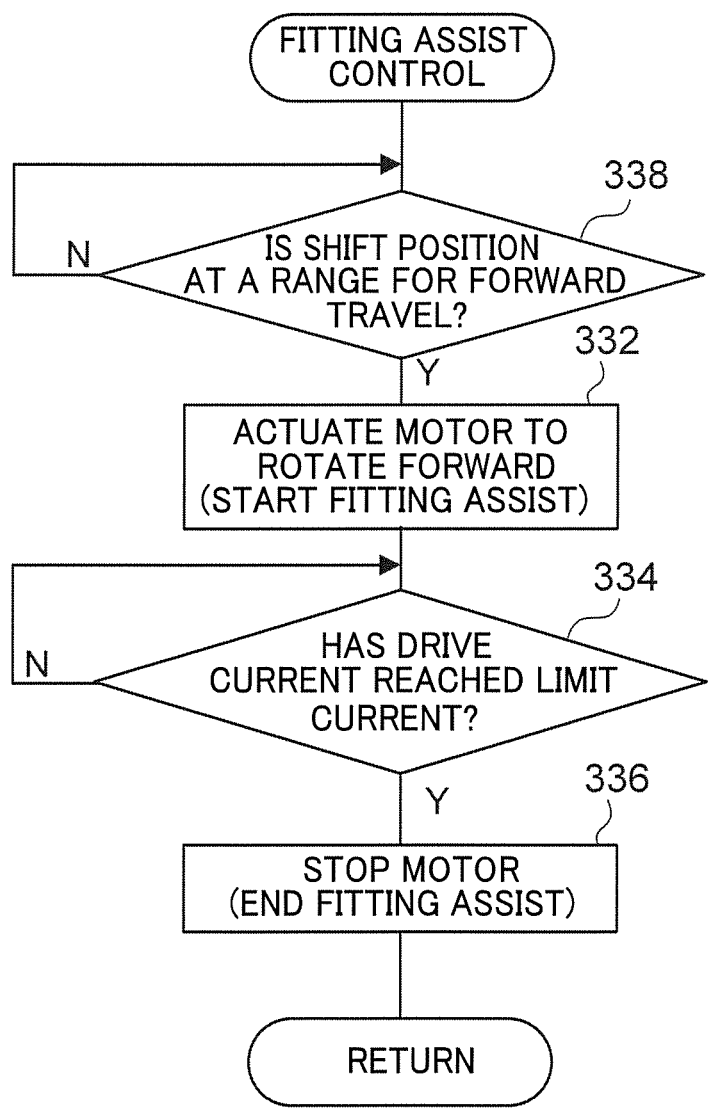

WEBBING TAKE-UP DEVICE AND SEATBELT DEVICE

CROSS-REFERENCE TO RELATED APPLICATION

This application claims priority under 35 USC 119 from Japanese Patent application No. 2015-034361 filed on Feb. 24, 2015, the disclosure of which is incorporated by reference herein.

BACKGROUND

Technical Field

The present disclosure relates to a webbing take-up device and a seatbelt device employing the webbing take-up device.

Related Art

Vehicles such as passenger vehicles are attached with seatbelt devices that use webbing to restrain an occupant sitting in a seat. Seatbelt devices are provided with a webbing take-up device that takes up and stores the webbing on a spool when not being worn. In webbing take-up devices, there is demand for a pre-tensioner function that restrains the occupant with the webbing in the event of sudden vehicle deceleration, in addition to a take-up function to take up the webbing onto the spool when the occupant releases wearing of the webbing.

Webbing take-up devices include what are known as "motor retractors", in which the spool is rotated in a webbing take-up direction by drive force of a motor to take up and store the webbing. Webbing take-up devices have been proposed that include both a take-up assist mechanism to achieve a take-up function using drive force of a motor, and a pre-tensioner mechanism to achieve a pre-tensioner function (for example, Japanese Patent Application Laid-Open (JP-A) No. 2007-099257).

In JP-A No. 2007-099257, the rotation speed of an output shaft of the motor is set with at least two speeds, namely a first speed, and a second speed that is faster than the first speed. Moreover, in JP-A No. 2007-099257, a first drive force transmission mechanism that transmits rotation of the output shaft of the motor to the spool at a predetermined speed reduction ratio, and a second drive force transmission mechanism that transmits rotation of the output shaft of the motor to the spool at a higher speed reduction ratio than the predetermined speed reduction ratio, are provided as drive force transmission mechanisms.

Accordingly, in JP-A No. 2007-099257, rotation of the motor at the first speed is transmitted to the spool through the first drive force transmission mechanism such that the spool is rotated at a high speed and low torque and reliably takes up the webbing onto the spool. Moreover, in JP-A No. 2007-099257, in the event of sudden vehicle deceleration, rotation force of the motor rotated at the second speed is transmitted to the spool through the second drive force transmission mechanism such that the spool is rotated at a low speed and high torque, obtaining an occupant restraint state in response to the sudden vehicle deceleration. Moreover, JP-A No. 2007-099257 enables the webbing to be pulled out by driving the motor in reverse after the occupant restraint state in the event of sudden vehicle deceleration in order to release the locked state of the spool.

Note that under normal circumstances, webbing take-up includes take-up to place the webbing in firm contact with the occupant when the occupant is wearing the webbing, and take-up to store the webbing when wearing has been released. To take up the webbing when wearing has been released, it is necessary to lower the take-up torque of the spool, so as to achieve take up with trouble-free movement of the webbing and tongue provided to the webbing.

However, when taking up the webbing to place the webbing in firm contact with the occupant, it is necessary to pull the webbing tightly to place the webbing in firm contact with the occupant in order to remove any slight looseness, known as "slack", in the webbing worn by the occupant. However, if the webbing is pulled too tightly, a large load is placed on the shoulder region of the occupant, for example, causing the occupant discomfort. Accordingly, in order to place the webbing in firm contact with the occupant, it is necessary to set the take-up torque of the spool so as to obtain an appropriate occupant restraint performance without placing a larger load on the occupant than is necessary.

In webbing take-up devices employing a motor, the take-up function demands reliable slack removal in order to secure high occupant restraint performance in a state in which the webbing is being worn. Moreover, for take up functionality, when webbing released from wearing by the occupant is taken up onto the spool, there is demand for smooth take up at a lower take-up torque than the take-up torque when placing the webbing in firm contact with the occupant.

SUMMARY

In consideration of the above circumstances, the present disclosure provides a webbing take-up device and a seatbelt device obtaining trouble-free webbing take-up and storage, as well as high occupant restraint performance in a case in which the webbing is being worn, using drive force of a motor.

A first aspect of the present disclosure is a webbing take-up device including a take-up shaft to which a base end of occupant restraint webbing is anchored, that takes up the webbing in a layered shape by rotating in a take-up direction, and that is rotated in a pull-out direction in a case in which the webbing is pulled out, an attachment and detachment detection unit that detects engagement and engagement release between a tongue provided to the webbing and a buckle fixed to a vehicle body, a motor that is provided with an output shaft that is rotated in a first direction and in a second direction that is an opposite direction to the first direction, in which a rotation speed of the output shaft is controlled according to a supplied drive voltage, and an output torque of the output shaft is controlled according to a supplied drive current, a first transmission unit that transmits rotation of the output shaft in the first direction to the take-up shaft, and that rotates the take-up shaft in the take-up direction, a second transmission unit that transmits rotation of the output shaft in the second direction to the take-up shaft, and that rotates the take-up shaft in the take-up direction, and that also transmits the output torque of the output shaft to the take-up shaft within a range in which the take-up torque of the take-up shaft does not reach a preset first torque, and a control unit that, in cases in which engagement between the tongue and the buckle has been detected, controls the drive voltage and the drive current such that the output shaft rotates in the first direction, and the take-up torque of the take-up shaft reaches a second torque higher than the first torque and capable of obtaining a preset occupant restraint performance, and that, in cases in which release of engagement between the tongue and the buckle has been detected, controls the drive voltage such that the output shaft rotates in the second direction at a rotation speed at which the take-up shaft obtains a preset take-up speed.

The webbing take-up device includes the first transmission unit that transmits the rotation of the output shaft to the take-up shaft and rotates the take-up shaft in the take-up direction due to the output shaft of the motor rotating in the first direction, and the second transmission unit that transmits the rotation of the output shaft to the take-up shaft and rotates the take-up shaft in the take-up direction due to the output shaft of the motor rotating in the second direction. The second transmission unit limits the take-up torque of the take-up shaft to the preset first torque.

In a case in which wearing of the webbing is released, the control unit rotates the output shaft of the motor in the second direction, thereby rotating the take-up shaft in the take-up direction through the second transmission unit, to take up the webbing onto the take-up shaft. In a case in which this is performed, the control unit controls the drive voltage to control the rotation speed of the output shaft of the motor, and the second transmission unit limits the take-up torque of the take-up shaft. The webbing is accordingly taken up onto the take-up shaft at a preset movement speed, and is moved without causing a tension of greater than the take-up torque to arise.

In a case in which the tongue and the buckle are engaged, the control unit actuates the motor such that the output shaft rotates in the first direction, thereby rotating the take-up shaft in the take-up direction through the first transmission unit. In a case in which this is performed, the control unit controls the drive current to control the output torque of the output shaft of the motor such that the take-up torque reaches the preset second torque. The webbing is accordingly placed in firm contact with the occupant so as to obtain a preset occupant restraint performance.

A webbing take-up device according to a second aspect of the present disclosure further includes a biasing member that biases the take-up shaft toward the take-up direction with a biasing force set so as not to be oppressive to an occupant wearing the webbing. Accordingly, in the webbing take-up device of the second aspect, wearing the webbing does not cause an occupant wearing the webbing to experience an oppressive feeling.

A webbing take-up device according to a third aspect of the present disclosure further includes a preparation detection unit that detects that preparation for restraint of the occupant with the webbing has been performed by detecting that a door of the vehicle has been closed, or detecting that an occupant is sitting in a seat, wherein the control unit starts control to rotate the output shaft of the motor in the first direction in cases in which engagement between the tongue and the buckle has been detected in a state in which the preparation detection unit has detected that the preparation for restraint of the occupant with the webbing has been performed.

For example, by closing a door that was opened in order for the occupant to board the vehicle, determination is made that the occupant will not perform an action that will move their body in order to close the door. In a state in which the occupant is sitting in the seat, it is determined that the occupant will not, for example, perform an action that will lift up their lumbar region.

In the webbing take-up device of the third aspect of the present disclosure, take-up to place the webbing in firm contact with the occupant is performed, for example, after detecting that the preparation for restraint of the occupant with the webbing has been completed using at least one of a door detection unit that detects opening and closing of the door, or a seating detection unit that detects the occupant sitting on the seat, and after engaging the tongue with the buckle.

In a webbing take-up device according to a fourth aspect of the present disclosure, at least one out of a speed detection unit that outputs a detection signal after a vehicle speed has reached a preset forward speed, or a shift position detection unit that outputs a detection signal after a shift position of a shift lever of the vehicle is placed in a forward travel position, is provided as a vehicle state detection unit, and the control unit starts control to rotate the output shaft of the motor in the first direction due to being input with a detection signal from the vehicle state detection unit in a state in which engagement between the tongue and the buckle has been detected.

In a vehicle provided with an automatic transmission, the shift lever of the vehicle is, for example, moved from a shift position corresponding to non-forward travel such as a P range, an R range, or an N range, to a shift position for forward travel such as a D range before the vehicle travels forward. A speed in a forward direction arises in a case in which the vehicle starts to travel forward. Accordingly, a vehicle state of whether or not the vehicle has started to travel forward can be obtained from the shift position of the shift lever, and from the vehicle speed.

In the webbing take-up device according to the fourth aspect of the present disclosure, take-up to place the webbing in firm contact with the occupant is performed by detecting that the vehicle state is a state for starting forward travel, or a state in which forward travel has started.

In a webbing take-up device according to a fifth aspect of the present disclosure, control to rotate the output shaft of the motor in the first direction is started in a buckle device that moves the buckle between a preset stowed position and an attachment and detachment position for engaging the tongue with the buckle due to the buckle with which the tongue has been engaged being moved to the stowed position.

A seatbelt device of a sixth aspect of the present disclosure includes the webbing take-up device of any one of the first aspect to the fourth aspect, and a buckle device that moves the buckle between a preset stowed position and an attachment and detachment position for engaging the tongue with the buckle, wherein the control unit starts control to rotate the output shaft of the motor in the first direction due to the buckle with which the tongue has been engaged being moved to the stowed position.

In the buckle device that moves the buckle between the attachment and detachment position for engaging the tongue with the buckle and the stowed position, the stowed position is further to a pull-out direction side of the webbing than the attachment and detachment position. Accordingly, if the buckle was moved to the stowed position in a state in which the webbing was in firm contact with the occupant, the webbing would be strapped even more tightly by the webbing.

Accordingly, in the webbing take-up device of the fifth aspect, and in the seatbelt device of the sixth aspect, take-up to place the webbing in firm contact with the occupant is performed after the buckle with which the tongue has been engaged has been moved to the stowed position. This thereby prevents the occupant wearing the webbing from being strapped more tightly than necessary by the webbing.

The present disclosure employs a motor, and enables trouble-free take up and storage of webbing in a case in which wearing has been released by an occupant. The present disclosure moreover enables the webbing to be placed in firm contact with the occupant by rotating the take-up shaft in the take-up direction at a higher take-up torque than during storage, enabling high occupant restraint performance to be obtained.

BRIEF DESCRIPTION OF THE DRAWINGS

Exemplary embodiments of the present disclosure will be described in detail based on the following figures, wherein:

FIG. 7B is a flowchart illustrating an example of fitting assist control according to the first exemplary embodiment, illustrating a case employing a shift position sensor;

DETAILED DESCRIPTION

Detailed explanation follows regarding exemplary embodiments of the present disclosure, with reference to the drawings.

First Exemplary Embodiment

Figure 1:
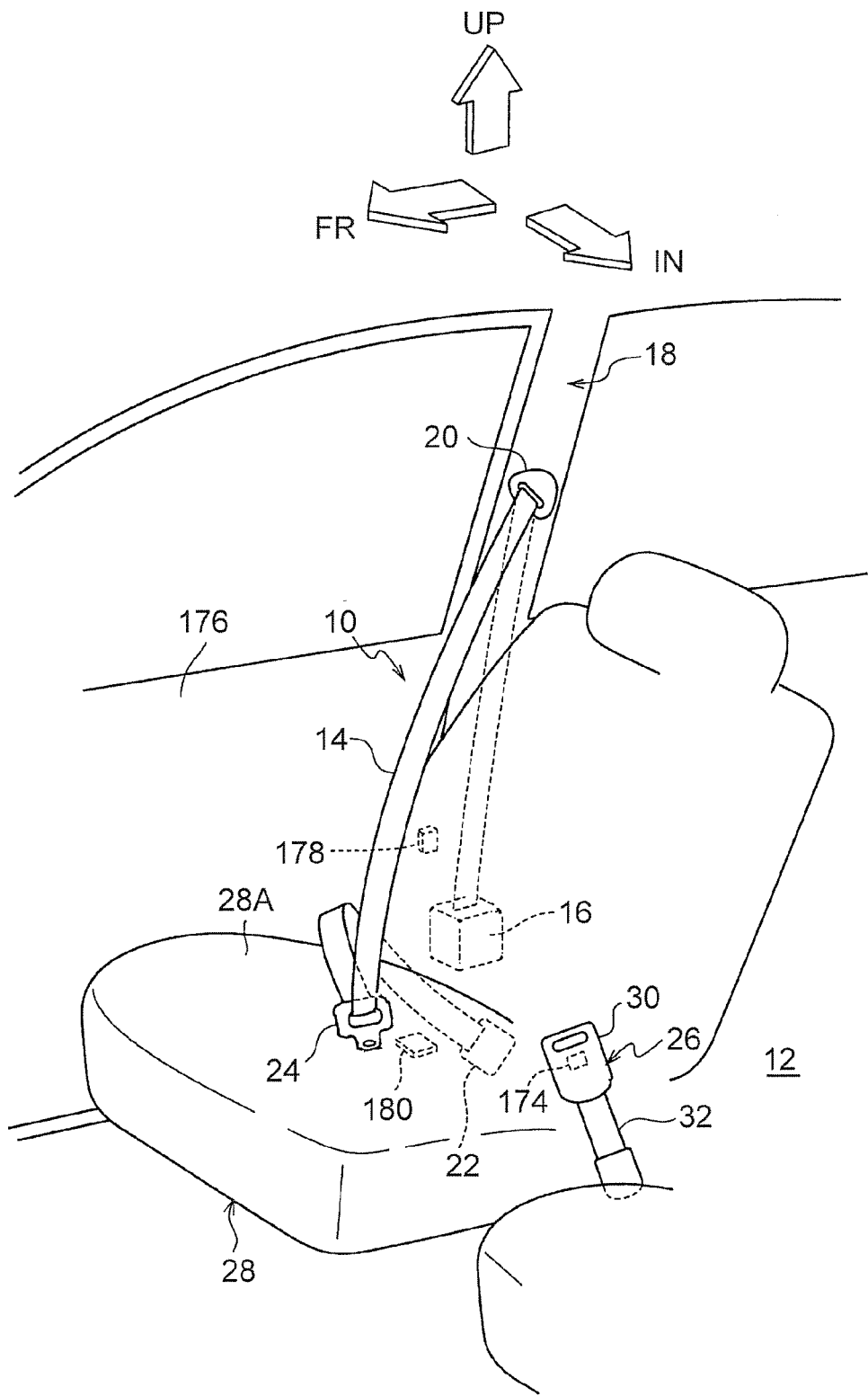
FIG. 1 is a schematic perspective view of relevant portions of a vehicle, illustrating an example of a seatbelt device according to a first exemplary embodiment.

FIG. 1 illustrates a seatbelt device 10 according to a first exemplary embodiment. The seatbelt device 10 is employed in a vehicle 12, such as a passenger vehicle. In the following explanation, the arrow FR indicates the front in the front-rear direction, the arrow UP indicates upward in the vertical direction, and the arrow IN indicates the vehicle width direction inside of the vehicle 12.

Configuration Example of Seatbelt Device

The seatbelt device 10 includes a webbing take-up device 16 that takes up and stores an elongated belt shaped webbing 14 from a base end side, this being one length direction end side. The webbing take-up device 16 is, for example, disposed at a lower end portion of a center pillar 18 of the vehicle 12, and is fixed to the vehicle body, not illustrated in the drawings. The seatbelt device 10 is what is known as a 3-point type seatbelt device, and the webbing 14 that is pulled out from the webbing take-up device 16 is, for example, wound and folded back on itself around a slip joint 20 attached to an upper portion of the center pillar 18. A leading end portion of the webbing 14 that is folded back on itself at the slip joint 20 is anchored to an anchor plate 22 fixed in the vicinity of a lower end portion of the center pillar 18.

The webbing 14 of the seatbelt device 10 is provided with a tongue 24 between the slip joint 20 and the anchor plate 22. The tongue 24 is capable of sliding along the length direction of the webbing 14. The seatbelt device 10 also includes a buckle device 26. The buckle device 26 is disposed on the opposite side of a seat (for example a front seat) 28, on which an occupant of the vehicle 12 sits, to the webbing take-up device 16. One end of the buckle device 26 includes an arm 32 to which a buckle 30 is attached, and, for example, another end side of the arm 32 is fixed to the vehicle body such that the buckle 30 is at a predetermined position in the vicinity of an upper face of a seat section 28A of the seat 28.

The occupant sitting in the seat 28 holds the tongue 24 and pulls the webbing 14 out from the webbing take-up device 16, and engages the tongue 24 with the buckle 30, to place the seatbelt device 10 in a webbing worn state in which the webbing 14 is capable of restraining the occupant. Respective seatbelt devices 10 are provided to both the driving seat and the front passenger seat, these being front seats of the vehicle 12, and are also provided to rear seats corresponding to the maximum number of seated occupants. In the following explanation, however, explanation is given regarding the example of the seatbelt device 10 provided to the driving seat. A known configuration is applied as the basic configuration of the seatbelt device 10.

Figure 2:
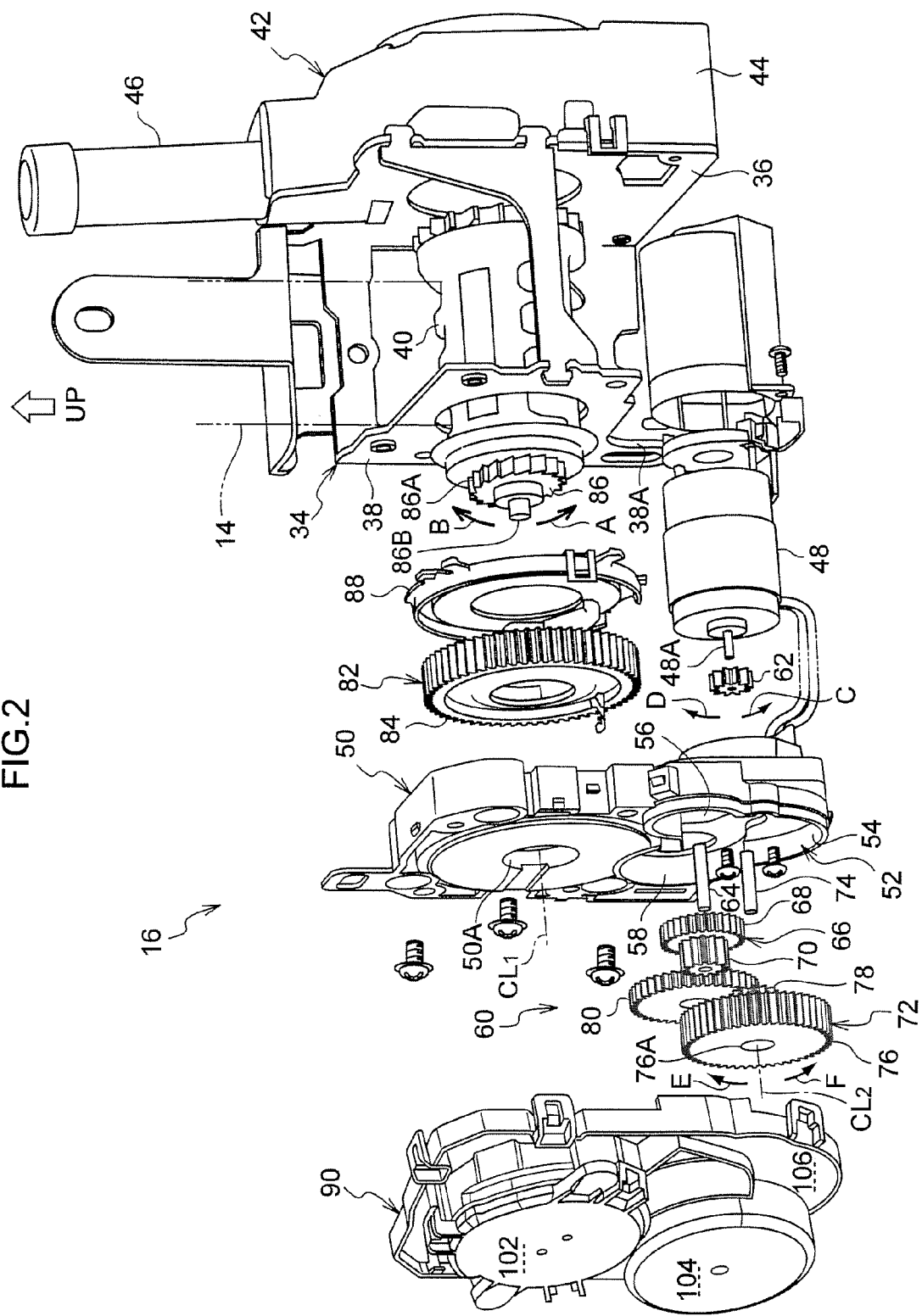
FIG. 2 is a perspective view illustrating relevant portions of an example of a webbing take-up device.
Figure 3:
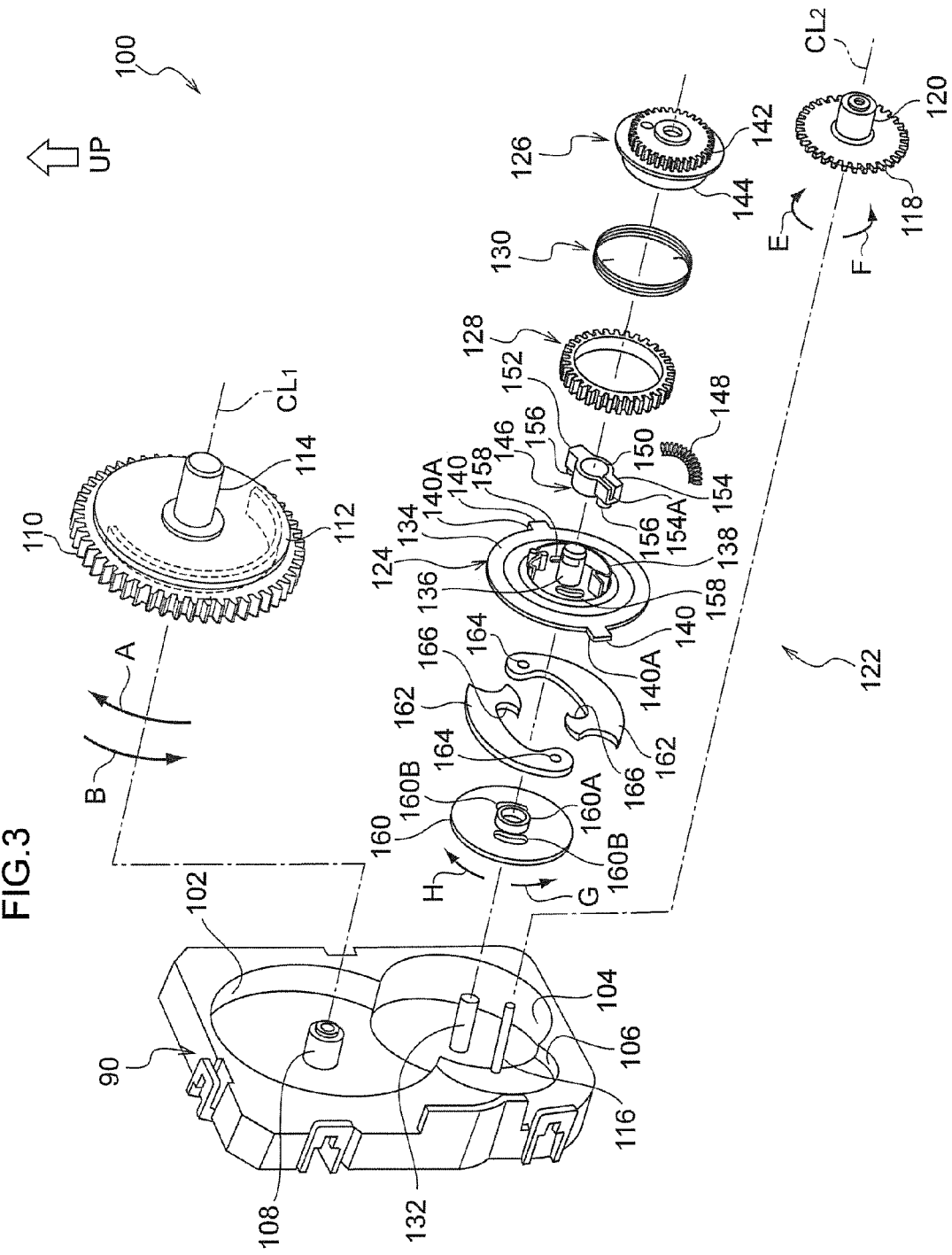
FIG. 3 is a perspective view illustrating relevant portions of an example of a webbing take-up device, showing a different location to that in FIG. 2.

FIG. 2 and FIG. 3 illustrate an example of the webbing take-up device 16 according to the first exemplary embodiment. As illustrated in FIG. 2, the webbing take-up device 16 includes a frame 34 that is fixed to the vehicle body, not illustrated in the drawings. The frame 34 is formed with a U-shaped cross-section profile, has respective faces facing along the vehicle front-rear direction when in a state fixed to the vehicle body, and includes mutually facing leg plates 36, 38. A spool 40, configuring a take-up shaft, is disposed between the leg plates 36, 38. The spool 40 is formed in a substantially circular cylinder shape, and spans between the leg plates 36, 38 so as to be capable of rotating.

A base end portion configuring one length direction end side of the elongated belt shaped webbing 14 is anchored to an outer peripheral portion of the spool 40. The spool 40 is rotated in one direction (for example, the arrow A direction in FIG. 2) about an axis of its axial line such that the webbing 14 is taken up onto the spool 40 in a layered shape. The spool 40 rotates in another direction (the opposite direction to the one direction, the arrow B direction in FIG. 2) in a case in which the taken up webbing 14 is pulled toward an end portion side on the opposite side to the base end side. In the following explanation, as an example, the arrow A direction is referred to as the take-up direction of the webbing 14, and the arrow B direction is referred to as the pull-out direction of the webbing 14.

A rod shaped torsion shaft (not illustrated in the drawings) with its length direction running along the axial line direction of the spool 40 is provided at an axial center portion of the spool 40. The torsion shaft is connected to the spool 40 in the vicinity of an end portion of the leg plate 38 in a state incapable of rotating relative to the spool 40, and is applied with a known configuration so as to rotate as a unit with the spool 40.

Housing 44 for a lock mechanism 42 is attached to a face of the leg plate 36 on the opposite side to the leg plate 38. In the webbing take-up device 16, the lock mechanism 42 functions as an example of a locking unit that restricts the webbing 14 from being pulled out in the event of sudden deceleration of the vehicle. The torsion shaft mentioned above is rotatably supported by the housing 44, either directly or indirectly. The housing 44 houses various components configuring what is known as a "VSIR mechanism" that actuates in a sudden vehicle deceleration state, and that by actuating, restricts a leg plate 36 side end portion of the torsion shaft from rotating in the pull-out direction, and various components configuring what is known as a "WSIR mechanism" that is actuated by sudden rotation of the torsion shaft in the pull-out direction, and that by actuating, restricts the leg plate 36 side end portion of the torsion shaft from rotating in the pull-out direction, thereby forming the lock mechanism 42.

The leg plate 36 is provided with a pre-tensioner 46 on the opposite side to the leg plate 38. In the webbing take-up device 16, the pre-tensioner 46 functions as an example of a forced tensioning unit. The pre-tensioner 46 actuates in a sudden vehicle deceleration state, and by actuating, applies rotation force in the take-up direction to the leg plate 36 side end portion of the torsion shaft, or to the spool 40, thereby forcibly rotating the spool 40 in the take-up direction. The seatbelt device 10 accordingly prevents the body of the occupant from moving toward the vehicle front in the event of sudden vehicle deceleration using the webbing 14.

The webbing take-up device 16 is provided with a motor 48. The motor 48 of the first exemplary embodiment is applied with a known configuration, such that by supplying the motor 48 with a drive voltage and a drive current, an output shaft rotates at a rotation speed and in a rotation direction according to the supplied drive voltage, and obtains an output torque according to the supplied drive current. The webbing take-up device 16 functions as a motor retractor that rotates the spool 40 in the take-up direction using the drive force of the motor 48, thereby taking up the webbing 14. In the webbing take-up device 16, the motor 48 is, for example, disposed between the leg plates 36, 38, at the lower side of the spool 40. The motor 48 is disposed such that the axial line direction of an output shaft 48A, this being a rotation shaft, runs along the axial line direction of the spool 40. The output shaft 48A is exposed to the opposite side to the leg plate 36 through a through hole 38A formed at a lower portion of the one leg plate 38. The output shaft 48A of the motor 48 is driven to rotate in a first direction, and a second direction that is the opposite direction to the first direction. In the following explanation, as an example, the first direction is the arrow C direction, and is referred to as the forward rotation direction of the motor 48, and the second direction is the arrow D direction, and is referred to as the reverse rotation direction of the motor 48.

Configuration Example of First Transmission Unit

Gear housing 50, serving as a housing member, is attached to the leg plate 38 on the opposite side to the leg plate 36. A lower recess 52, serving as a housing portion open toward the opposite side to the leg plate 38, is formed at a lower side portion of the gear housing 50. A first recess portion 54 is formed to a lower portion of the lower recess 52, and a second recess portion 56 and a third recess portion 58 are formed to an upper portion of the lower recess 52. The first recess portion 54, the second recess portion 56, and the third recess portion 58 are each formed in circular cylinder shapes with axial line directions running along the axial line direction of the output shaft 48A of the motor 48, and the first recess portion 54, the second recess portion 56, and the third recess portion 58 overlap so as to be contiguous to each other in the lower recess 52. The first recess portion 54 has a larger diameter than the second recess portion 56 and the third recess portion 58. The second recess portion 56 has a smaller diameter than the third recess portion 58.

A circular cylinder shaped upper recess (not illustrated in the drawings), serving as an additional housing portion and opening toward the leg plate 38 side, is formed at an upper side portion of the gear housing 50. The gear housing 50 is disposed such that an axial line of the upper recess is coaxial to the axial line of the spool 40. The internal diameter of the upper recess is a larger diameter than the internal diameter of the first recess portion 54 of the lower recess 52. In the gear housing 50, the upper recess is in communication with the third recess portion 58 of the lower recess 52 (not illustrated in the drawings). Moreover, in the gear housing 50, a main body portion of the motor 48 is fixed to a bottom wall of the lower recess 52, and the output shaft 48A of the motor 48 is inserted through the bottom wall of the first recess portion 54 and projects out into the first recess portion 54.

A drive force transmission mechanism 60 is housed inside the gear housing 50. In the first exemplary embodiment, the drive force transmission mechanism 60 functions as an example of a first transmission unit. An output gear 62, which is an external spur gear, is attached to the output shaft 48A of the motor 48 that projects out into the first recess portion 54. A two speed gear shaft 64 is provided coaxially to the second recess portion 56 and integrally to the bottom wall of the second recess portion 56 of the lower recess 52. A two speed gear 66 is rotatably supported on the two speed gear shaft 64. The two speed gear 66 is formed with a large diameter gear 68, and a small diameter gear 70 that has a smaller diameter than the large diameter gear 68, both of which are external spur gears and are housed inside the second recess portion 56. The large diameter gear 68 of the two speed gear 66 has a larger diameter than the output gear 62, and meshes together with the output gear 62. Note that in the following explanation, the large and small diameters of gears reflect differences not only between the external diameters, but also between the number of teeth, with larger diameter gears having more teeth than smaller diameter gears.

The first recess portion 54 of the lower recess 52 is provided with an overload release mechanism 72, serving as a load limiting mechanism. A bottom wall of the first recess portion 54 is integrally provided with a support shaft 74 coaxially to the first recess portion 54. A ring holder 76 and a rotor 78 that form the overload release mechanism 72 are rotatably supported on the support shaft 74.

The rotor 78 is an external spur gear, and is rotatably supported on the support shaft 74. The ring holder 76 includes a hollow shaped axial center portion (not illustrated in the drawings), has a larger external diameter than the rotor 78, and is configured as an external spur gear. The rotor 78 is coaxial to the ring holder 76, and one axial line direction end side (the opposite side of the gear housing 50 to the first recess portion 54 side) of the rotor 78 is inserted into the hollow inside of the ring holder 76.

A predetermined number of (for example, two) ring members, not illustrated in the drawings, formed from resilient members, are interposed between an inner peripheral face of the hollow inside of the ring holder 76 and the rotor 78. Due to the ring members formed from resilient members, the ring holder 76 is capable of rotating as a unit with the rotor 78, and is rotatably supported on the support shaft 74 through the rotor 78. The ring holder 76 becomes capable of relative rotation with respect to the rotor 78, against the elastic force (biasing force) from the ring members, in a case in which the ring holder 76 is subjected to a predetermined load or greater in a rotation direction. In the overload release mechanism 72, the ring holder 76 and the rotor 78 rotate relative to each other in a case in which a rotation force caused by a preset load or greater is applied between the ring holder 76 and the rotor 78, thereby preventing transmission of the rotation force caused by the preset load or greater.

The ring holder 76 has a larger diameter than the small diameter gear 70 of the two speed gear 66, and meshes together with the small diameter gear 70. Rotation of the output shaft 48A of the motor 48 is transmitted to the ring holder 76 through the two speed gear 66.

Inside the third recess portion 58 of the lower recess 52, an intermediate gear 80, which is an external spur gear, is configured coaxially to the third recess portion 58, and is supported so as to be capable of rotating. The intermediate gear 80 has a larger diameter than the rotor 78 of the overload release mechanism 72, and meshes together with the rotor 78.

In the gear housing 50, a clutch mechanism 82 is disposed inside the upper recess, not illustrated in the drawings. In the first exemplary embodiment, the clutch mechanism 82 functions as an example of a clutch unit. The clutch mechanism 82 includes a clutch gear 84. The clutch gear 84 is hollow inside, and is an external spur gear. The clutch gear 84 has a larger diameter than the intermediate gear 80, and meshes together with the intermediate gear 80 at a portion where the upper recess formed with the gear housing 50 is in communication with the third recess portion 58 of the lower recess 52. Accordingly, in a case in which the motor 48 is actuated and the output shaft 48A rotates forward (rotates in the arrow C direction), rotation force (drive force) of the output shaft 48A is slowed and transmitted through the output gear 62, the two speed gear 66, the overload release mechanism 72 (the ring holder 76 and the rotor 78), and the intermediate gear 80, to rotate the clutch gear 84 in the take-up direction of the webbing 14.

A predetermined number of (for example two) lock bars (not illustrated in the drawings), serving as clutch members, are supported in the hollow inside of the clutch gear 84 so as to be capable of rotating when in a biased state. A ratchet gear 86 is disposed coaxially at an axial center portion of the clutch gear 84. The ratchet gear 86 is coupled coaxially to the spool 40 in a state incapable of rotating relative thereto, through a leg plate 38 side end portion of the torsion shaft mentioned above.

Ratchet teeth 86A are formed as external teeth around the entire periphery of the ratchet gear 86, and the ratchet teeth 86A are disposed in the hollow inside of the clutch gear 84. A substantially disk shaped clutch cover 88 is disposed between the leg plate 38 and the clutch gear 84. The clutch cover 88 is attached so as to close off the opening of the upper recess of the gear housing 50 with the ratchet gear 86 in a state penetrating an axial center portion of the clutch cover 88.

In the clutch mechanism 82, in a case in which the clutch gear 84 rotates in the take-up direction due to forward rotation of the output shaft 48A of the motor 48, each of the lock bars, not illustrated in the drawings, inside the clutch gear 84 swings against the biasing force and meshes together with the ratchet teeth 86A. Accordingly, in the clutch mechanism 82, due to the clutch gear 84 rotating toward the take-up direction, the clutch gear 84 and the ratchet gear 86 rotate together as a unit, rotating the spool 40 in the take-up direction.

In the clutch mechanism 82, in a case in which the spool 40 rotates in the pull-out direction due to the webbing 14 being pulled, the rotation of the spool 40 in the pull-out direction rotates the ratchet gear 86 in the pull-out direction. In the clutch mechanism 82, the ratchet teeth 86A and the lock bars inside the clutch gear 84 are in a non-engaged state in a case in which the ratchet gear 86 rotates in the pull-out direction, and the clutch gear 84 and the ratchet gear 86 rotate relative to each other. This thereby prevents rotation of the spool 40 in the pull-out direction from being transmitted to the drive force transmission mechanism 60 and the like through the clutch gear 84.

Moreover, in the clutch mechanism 82, in a case in which the output shaft 48A of the motor 48 rotates in reverse, the clutch gear 84 is rotated in the pull-out direction, reliably releasing the engaged state between the lock bars inside the clutch gear 84 and the ratchet teeth 86A. Accordingly, in the webbing take-up device 16 provided with the clutch mechanism 82, rotating the output shaft 48A of the motor 48 in reverse allows the webbing 14 to be pulled out after the pre-tensioner 46 or the like has been actuated and the spool 40 has been forcibly rotated in the take-up direction.

Configuration Example of Second Transmission Unit

A gear housing 90 is attached to the webbing take-up device 16 on the opposite side of the gear housing 50 to the leg plate 38. A rotation shaft 86B of the ratchet gear 86 projects out toward the opposite side of the leg plate 38 through a through hole 50A formed in the bottom wall of the upper recess of the gear housing 50. A through hole 76A is formed at the axial center portion of the ring holder 76 of the overload release mechanism 72, and a shaft or the like is inserted into the through hole 76A, thereby coupling the link holder 76 so as to rotate as a unit together with the rotor 78. Note that in the following explanation, the axial line of the ratchet gear 86 (spool 40) is labelled $CL_1$, and the axial line of the rotor 78 is labelled $CL_2$. A sheet or the like, not illustrated in the drawings, may be interposed between the gear housing 50 and the gear housing 90.

FIG. 3 illustrates an example of a drive force transmission mechanism 100 that is housed inside the gear housing 90. In the first exemplary embodiment, the drive force transmission mechanism 100 functions as an example of a second transmission unit. In FIG. 3, the gear housing 90 is illustrated in a state viewed from the side of the gear housing 50, and in FIG. 3, the right near side of the page is toward the side of the gear housing 50 and the leg plate 38 (both of which are omitted from illustration in FIG. 3). In the explanation of FIG. 3, this direction is described as the gear housing 50 side or the leg plate 38 side.

A gear housing 50 side face of the gear housing 90 is formed with a fourth recess portion 102, a fifth recess portion 104, and a sixth recess portion 106. The fourth recess portion 102 is formed in a substantially circular cylinder shape at an upper portion side of the gear housing 90. The fifth recess portion 104 is formed in a substantially circular cylinder shape at a lower portion side of the gear housing 90, has an upper portion side overlapping with the fourth recess portion 102, and is contiguous to the fourth recess portion 102. The sixth recess portion 106 is formed in a substantially circular cylinder shape at a lower portion side of the gear housing 90, partially overlaps with the fifth recess portion 104, and is contiguous to the fifth recess portion 104. The gear housing 90 is attached to the gear housing 50 such that the axial center of the fourth recess portion 102 is coaxial to the axial line $CL_1$, and the axial center of the sixth recess portion 106 is coaxial to the axial line $CL_2$.

In the gear housing 90, a support shaft 108 is formed to a bottom wall of the fourth recess portion 102 so as to be coaxial to the fourth recess portion 102 and integral to the bottom wall. A spool gear 110 is housed inside the fourth recess portion 102. The spool gear 110 is formed with a bottomed circular cylinder shape, with an open side facing the side of the bottom wall of the fourth recess portion 102, and is rotatably supported on the support shaft 108.

The spool gear 110 is formed as an external spur gear. A take-up spring 112, serving as a biasing unit and employing a spiral spring or the like, is disposed inside the spool gear 110. In the first exemplary embodiment, the take-up spring 112 functions as an example of a biasing member. One end of the take-up spring 112 is anchored to an inner peripheral face of the spool gear 110, and the other end of the take-up spring 112 is, for example, anchored to an adaptor, not illustrated in the drawings, that is rotatably supported on the support shaft 108 of the fourth recess portion 102, and the take-up spring 112 biases the spool gear 110 toward the take-up direction (arrow A direction in FIG. 3) with respect to the adaptor. The adaptor is, for example, prevented from rotating relative to the support shaft 108 by the biasing force of the take-up spring 112; however, the adaptor becomes capable of relative rotation toward the take-up direction and the pull-out direction with respect to the support shaft 108 when applied with a rotation force stronger than the biasing force of the take-up spring 112.

A rotation shaft 114 is integrally formed to an axial center portion of the spool gear 110. The rotation shaft 114 projects out from the spool gear 110 toward the gear housing 50. The rotation shaft 114 of the spool gear 110 is coupled to the rotation shaft 86B of the ratchet gear 86 (see FIG. 2). The spool gear 110 is accordingly rotated toward the take-up direction as a unit together with the ratchet gear 86 and the spool 40 by the biasing force of the take-up spring 112.

Note that the biasing force of the take-up spring 112 is a weak biasing force set at a level that does not allow the webbing 14 to become slack in a case in which the occupant is wearing the webbing 14. Namely, the biasing force is at a non-oppressive level that does not allow slack to arise in the webbing 14, yet does not cause the occupant to feel tightly bound, in a state in which the occupant is wearing the webbing 14. This biasing force of the take-up spring 112 is, for example, determined based on sensory evaluation by a person wearing the seatbelt device 10.

In the gear housing 90, a support shaft 116 is formed to a bottom wall of the sixth recess portion 106 so as to be coaxial to the sixth recess portion 106 and integral with the bottom wall. An idle gear 118, configured as an external spur gear, is housed inside the sixth recess portion 106. The idle gear 118 is rotatably supported by the support shaft 116 of the sixth recess portion 106. A rotation shaft 120 is integrally provided to an axial center portion of the idle gear 118, and the rotation shaft 120 is inserted into the through hole 76A of the ring holder 76 and is coupled to the rotor 78 (see FIG. 3 for both) so as to rotate as a unit therewith. Accordingly, the idle gear 118 is rotated in the arrow F direction in a case in which the motor 48 is actuated and rotates forward (rotates in the arrow C direction in FIG. 2), and the idle gear 118 is rotated in the arrow E direction in a case in which the motor 48 is actuated and rotates in reverse (rotates in the arrow D direction in FIG. 2).

The drive force transmission mechanism 100 includes a clutch mechanism 122. In the gear housing 90, the clutch mechanism 122 is housed inside the fifth recess portion 104. The clutch mechanism 122 functions as an example of a clutch unit. The clutch mechanism 122 includes a base portion 124, a rotor 126, a clutch gear 128, and a clutch spring 130, and functions as a centrifugal slip clutch.

The gear housing 90 is provided with a support shaft 132 at a bottom wall of the fifth recess portion 104. The support shaft 132 is integrally provided so as to project out from an axial center portion of the fifth recess portion 104 toward the gear housing 50 (see FIG. 2).

The base portion 124 is provided with a disk shaped base plate 134. The base plate 134 is rotatably supported on the support shaft 132 formed to the fifth recess portion 104 of the gear housing 90. The base plate 134 is formed with a support shaft 136 at an axial center portion, and with a substantially C-shaped side wall 138 that is coaxial to the support shaft 136. The support shaft 136 and the side wall 138 of the base plate 134 are provided projecting out toward the opposite direction to the gear housing 90. The base plate 134 is also formed with a pair of rectangular shaped extension portions 140 projecting out from a peripheral edge portion of the base plate 134 toward the radial direction outside. Leading end portions of the extension portions 140 have circular arc shapes coaxial to the base plate 134, and projection portions 140A are formed projecting out from the leading end portions toward the gear housing 90.

The rotor 126 is formed in a bottomed circular cylinder shape, with an open side facing toward the base plate 134, and is disposed coaxially to the base plate 134. The side wall 138 of the base plate 134 is fitted into an opening of the rotor 126 that faces the base plate 134, such that the rotor 126 is capable of rotating as a unit together with the base plate 134. One axial direction end side of the rotor 126 is configured by a gear 142 that is formed as an external spur gear, and the other end side of the rotor 126 is configured by a non-gear portion 144. The non-gear portion 144 is disposed on the base plate 134 side. The gear 142 of the rotor 126 meshes together with the idle gear 118, and is rotated by rotation force of the motor 48 in a case in which the motor 48 (see FIG. 2) is actuated.

The clutch gear 128 is formed in a circular cylinder shape, and an outer peripheral portion of which is formed as an external spur gear. The internal diameter of the clutch gear 128 is configured as a larger diameter than the external diameter of the non-gear portion 144 of the rotor 126, and an inner peripheral face of the clutch gear 128 faces the non-gear portion 144. The clutch gear 128 is disposed coaxially to, and capable of relative rotation with respect to, the rotor 126.

The clutch gear 128 is meshed together with the spool gear 110. A gap is formed between the clutch gear 128 and the rotor 126 due to configuring the internal diameter of the clutch gear 128 as a larger diameter than the external diameter of the non-gear portion 144 of the rotor 126. The clutch spring 130, employing, for example, a torsion coil spring, is disposed in this gap. In a natural state, this being a non-stretched and non-contracted state, the external diameter of the clutch spring 130 is a smaller diameter than the internal diameter of the clutch gear 128, and in a normal state, the clutch spring 130 is capable of relative rotation with respect to the clutch gear 128.

The base portion 124 is provided with a lever 146 and a return spring 148 between the base plate 134 and the rotor 126. The lever 146 is formed by a circular cylinder shaped shaft bearing 150, and a pair of coupling portions 152, 154 that project out from an outer peripheral portion of the shaft bearing 150 toward the radial direction outside. Each of the coupling portions 152, 154 is formed with a coupling projection 156, these projecting out in the same direction as each other. In a state in which the coupling projections 156 of the coupling portions 152, 154 face toward the base plate 134, the support shaft 136 of the base plate 134 is inserted into the shaft bearing 150, and the lever 146 is supported so as to be capable of rotating relative to the base plate 134.

The base plate 134 is formed with a pair of elongated holes 158 corresponding to the respective coupling projections 156 of the coupling portions 152, 154 of the lever 146. The pair of elongated holes 158 are provided in a pair straddling the support shaft 136, and each has a long axis in a circular arc shape centered on the support shaft 136, and is formed as a through hole in the base plate 134. The coupling projections 156 of the coupling portions 152, 154 of the lever 146 are respectively inserted into the elongated holes 158 of the base plate 134, limiting the range over which relative rotation of the lever 146 is possible with respect to the base plate 134.

The return spring 148 employs a coil spring, for example, and one end of the return spring 148 is anchored to the one coupling portion 152 of the lever 146. The other end of the return spring 148 is anchored to the side wall 138 formed to the base plate 134. The return spring 148 accordingly biases the lever 146 toward the arrow H direction with respect to the base plate 134. Due to the biasing force of the return spring 148, the lever 146 is retained by the base plate 134 such that the coupling projections 156 are at one end side of the respective elongated holes 158.

The other coupling portion 154 of the lever 146 is formed with an engagement recess 154A. The clutch spring 130 mentioned above is bent toward the radial direction inside at both ends, and one end of the clutch spring 130 is anchored to the engagement recess 154A formed to the coupling portion 154 of the lever 146, and the other end of the clutch spring 130 is anchored to an engagement recess, not illustrated in the drawings, formed to the non-gear portion 144 of the rotor 126.

The diameter of the clutch spring 130 accordingly increases in a case in which the lever 146 turns in the arrow G direction with respect to the base plate 134 against the biasing force of the return spring 148. Due to increasing in diameter, the clutch spring 130 makes pressing contact against the inner peripheral face of the clutch gear 128, and frictional force against the inner peripheral face of the clutch gear 128 couples the clutch spring 130 to the clutch gear 128 so as to rotate as a unit therewith.

The rotor 126 becomes capable of rotating as a unit together with the clutch gear 128 due to the integral coupling of the clutch spring 130 to the clutch gear 128 by frictional force. The rotor 126 and the clutch gear 128 rotate relative to each other when applied with rotation force exceeding the frictional force between the clutch spring 130 and the clutch gear 128. The rotor 126 also becomes capable of relative rotation with respect to the clutch gear 128 in a case in which the diameter of the clutch spring 130 decreases.

In the clutch mechanism 122, a circular spacer 160 is disposed between the gear housing 90 and the base plate 134, and a pair of weights 162 are disposed between the spacer 160 and the base plate 134. The spacer 160 is formed with a circular cylinder shaped shaft portion 160A at an axial center portion, and the support shaft 132 is inserted through the shaft portion 160A. At the periphery of the shaft portion 160A, a pair of bottomed escape grooves 160B is formed to the spacer 160 so as to correspond to the pair of respective elongated holes 158 formed to the base plate 134. Each of the escape grooves 160B is formed in a circular arc shape describing the same diameter as the elongated holes 158 of the base plate 134, and leading end portions of the respective coupling projections 156 of the lever 146 that project out from the elongated holes 158 of the base plate 134 are inserted into the escape grooves 160B. The lever 146 and the spacer 160 are prevented from interfering with each other due to inserting the leading end portions of the coupling projections 156 into the escape grooves 160B.

Each of the weights 162 has a wide, belt shaped external profile with length direction along a substantially circular arc shape, and the weights 162 are formed so as to have similar weights to each other. The respective weights 162 are disposed so as to surround the shaft portion 160A of the spacer 160. Each of the weights 162 is formed with a shaft bearing hole 164 on one length direction end side. A face on the gear housing 90 side of the base plate 134 is formed with a pair of support shafts, not illustrated in the drawings, at predetermined positions in the vicinity of an outer peripheral portion so as to oppose each other across an axial center portion. The support shafts of the base plate 134 are inserted into the shaft bearing holes 164, thereby supporting the respective weights 162 on the base plate 134 so as to be capable of swinging about the shaft bearing holes 164.

The other length direction end side of each of the weights 162 is formed with an engagement pawl 166 formed in a substantially U-shape. The coupling projections 156 of the lever 146 that project out through the elongated holes 158 of the base plate 134 engage with the respective engagement pawls 166 of the respective weights 162 in an inserted state inside the substantially U-shape.

In the clutch mechanism 122, in a case in which the rotor 126 is rotated in the arrow G direction, the base plate 134 is rotated in the arrow G direction. The respective weights 162 are supported on the base plate 134 by the support shafts, not illustrated in the drawings, and the respective weights 162 rotate following the rotation of the base plate 134. In a case in which this occurs, since the respective weights 162 are supported by the shaft bearing holes 164 on the one end side in the length direction, the engagement pawl 166 side of each weight 162 swings out so as to enlarge the diameter toward the radial direction outside of the base plate 134. In a case in which this occurs, peripheral edge portions of the respective weights 162 contact the respective projection portions 140A formed to the extension portions 140 of the base plate 134, thereby limiting the diameter enlargement.

Since the coupling projections 156 of the lever 146 are engaged with the engagement pawls 166 of the respective weights 162, in a case in which the weights 162 swing so as to increase in diameter, the lever 146 is turned in the arrow G direction with respect to the base plate 134 following the enlargement of the diameter of the weights 162. The one end side of the clutch spring 130 is anchored to the lever 146, and the end portion of the clutch spring 130 that is anchored to the coupling portion 154 of the lever 146 is turned in the arrow G direction accompanying turning of the lever 146 in the arrow G direction, thereby enlarging the diameter of the clutch spring 130. Accordingly, in the clutch mechanism 122, the clutch spring 130 contacts the inner peripheral face of the clutch gear 128, and the clutch gear 128 rotates in the arrow G direction together as a unit with the base plate 134.

The spool gear 110 is meshed together with the clutch gear 128, and in a case in which the clutch gear 128 rotates in the arrow G direction, the spool gear 110 makes up the insufficiency in the biasing force of the take-up spring 112, and the webbing 14 rotates in the arrow A direction, this being the take-up direction. Namely, in the drive force transmission mechanism 100, in a case in which the output shaft 48A of the motor 48 is rotated in reverse (the arrow D direction in FIG. 2), this rotation force is transmitted to the spool gear 110, and the spool gear 110 is rotated in the take-up direction. The spool 40 accordingly rotates in the take-up direction and takes up the webbing 14 (see FIG. 2).

Note that in a state in which the clutch spring 130 is in contact with the inner peripheral face of the clutch gear 128, the clutch spring 130 rotates relative to the clutch gear 128 against the frictional force in a case in which the take-up torque of the spool 40 reaches a preset torque. The clutch mechanism 122 thereby uses the frictional force arising between the clutch gear 128 and the clutch spring 130 to limit the take-up torque of the spool 40.

Moreover, in the clutch mechanism 122, rotation of the base plate 134 is stopped in a case in which the motor 48 stops and rotation of the rotor 126 stops. The lever 146 is accordingly turned toward the arrow H direction under the biasing force of the return spring 148, and the respective weights 162 swing accompanying turning of the lever 146, and decrease in diameter.

The one end side of the clutch spring 130 that is anchored to the coupling portion 154 of the lever 146 turns in the arrow H direction in a case in which the lever 146 turns in the arrow H direction under the biasing force of the return spring 148, decreasing the diameter of the clutch spring 130. The clutch spring 130 separates from the inner peripheral face of the clutch gear 128 due to the decrease in diameter. The engaged state between the rotor 126 and the clutch gear 128 in the clutch mechanism 122 is thereby released, enabling the clutch gear 128 to rotate relative to the base plate 134. In the clutch mechanism 122, in a case in which the rotor 126 is being rotated in the arrow H direction, the lever 146 is retained in a state biased toward the arrow H direction by the return spring 148, thereby retaining the clutch gear 128 in a state capable of relative rotation with respect to the base plate 134.

Configuration Example of Controller

Figure 4:
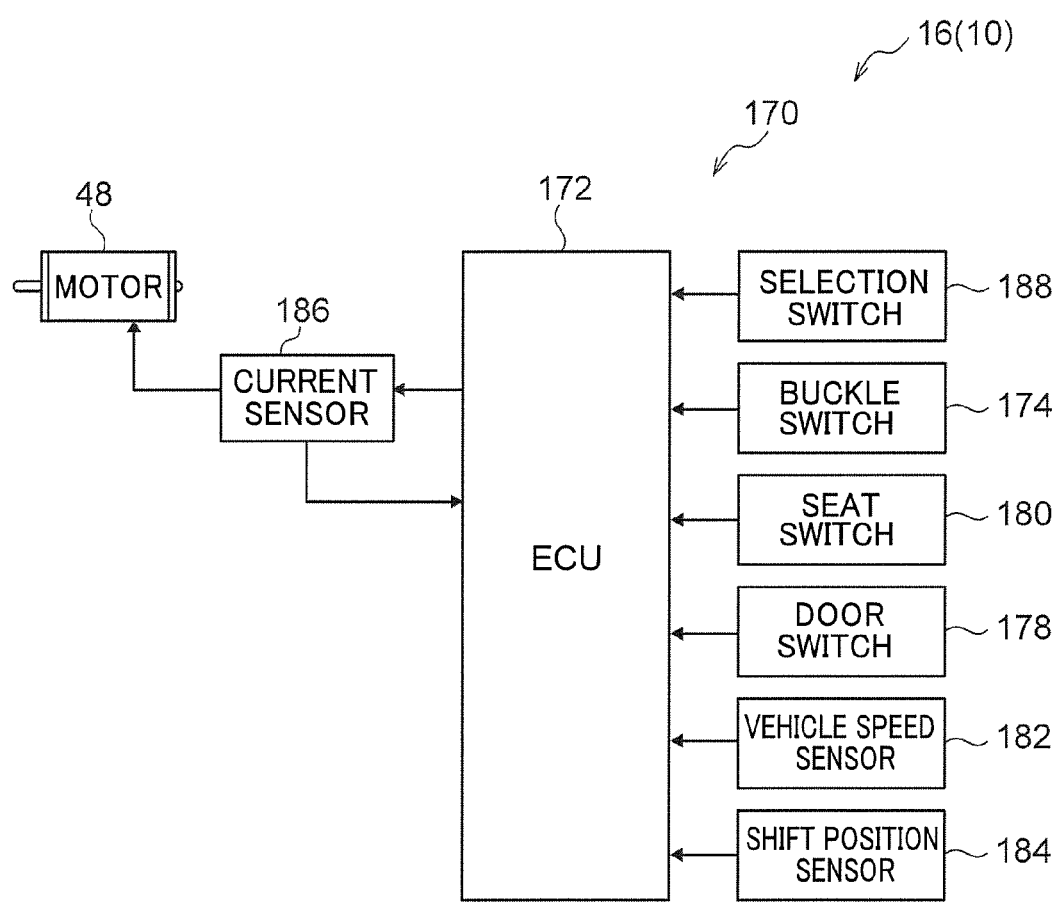
FIG. 4 is a block diagram illustrating relevant portions of an example of a controller of a webbing take-up device according to the first exemplary embodiment.

As illustrated in FIG. 4, the webbing take-up device 16 is provided with a controller 170 that controls actuation of the motor 48. The controller 170 includes an Electronic Control Unit (ECU) 172 containing various functional circuits such as a microcomputer, an A/D conversion circuit, a D/A conversion circuit, and a power circuit (drive circuit). In the first exemplary embodiment, the ECU 172 functions as an example of a control unit. Note that respective seatbelt devices 10 are provided to the driving seat, the front passenger seat, and the rear seats of the vehicle 12, and the seatbelt devices 10 are provided to the rear seats corresponding to the maximum number of seated occupants. ECUs 172 may be provided to each of the plural seatbelt devices 10, or a single ECU 172 may control webbing 14 take-up in plural seatbelt devices 10.

The motor 48, serving as a control target, is connected to the ECU 172. Electrical power is supplied to the ECU 172 from a battery, not illustrated in the drawings, provided to the vehicle 12. The ECU 172 operates using the electrical power supplied from the battery, and actuates the motor 48 using the electrical power supplied from the battery. The ECU 172 controls the drive voltage and the polarity of the drive voltage actuating the motor 48, thereby controlling the rotation speed and rotation direction (forward rotation or reverse rotation) of the output shaft 48A of the motor 48. In the webbing take-up device 16, the rotation speed of the spool 40, namely, the take-up speed of the webbing 14, is controlled by controlling the rotation speed of the motor 48. The ECU 172 controls the output torque by limiting the current when actuating the motor 48. In the webbing take-up device 16, the take-up torque of the spool 40 obtained depends on the output torque of the motor 48. Moreover, in the webbing take-up device 16, tension arises in the webbing 14 according to the take-up torque of the spool 40, and limiting the take-up torque accordingly limits the load applied to, for example, the shoulder region of the occupant wearing the webbing 14.

As illustrated in FIG. 1, in the seatbelt device 10, the buckle device 26 is provided with a buckle switch 174. The vehicle 12 is, for example, provided with a door switch 178 to detect opening and closing of a door 176, and a seat switch 180 to detect whether or not an occupant is sitting on the seat section 28A of the seat 28. In the first exemplary embodiment, the buckle switch 174 functions as an example of a wearing detection unit, the door switch 178 functions as an example of an opening and closing detection unit, and the seat switch 180 functions as an example of a seating detection unit.

In the seatbelt device 10, in a case in which an occupant seated on the seat section 28A of the seat 28 puts on the webbing 14, the webbing 14 is pulled out from the webbing take-up device 16, and the tongue 24 is engaged with the buckle 30. Operating a release button, not illustrated in the drawings, that is provided to the buckle 30, releases the engagement between the tongue 24 and the buckle 30 in the seatbelt device 10. The buckle switch 174 outputs signals according to the engagement state between the tongue 24 and the buckle 30. For example, the buckle switch 174 outputs an ON signal in a case in which the tongue 24 is engaged with the buckle 30, and outputs an OFF signal in a case in which the engagement is released.

The door switch 178 outputs signals according to an opened/closed state of the door 176 due to the occupant. For example, the door switch 178 outputs an OFF signal in a case in which the door 176 is closed, and outputs an ON signal in a case in which the door 176 is open. The seat switch 180 outputs signals according to an occupant sitting on the seat section 28A of the seat 28. For example, the seat switch 180 outputs an ON signal in a case in which an occupant sits on the seat 28 and presses down with a predetermined pressure or greater, and outputs an OFF signal in a case in which the occupant leaves the seat and the pressing force falls below the predetermined pressure.

As illustrated in FIG. 4, the buckle switch 174, the door switch 178, and the seat switch 180 are connected to the ECU 172. A vehicle speed sensor 182 that outputs signals according to the speed of travel of the vehicle 12, a shift position sensor 184 that outputs signals according to an operation state (for example a shift position) of a shift lever, not illustrated in the drawings, of the vehicle 12, and the like, are also connected to the ECU 172. In the first exemplary embodiment, the vehicle speed sensor 182 functions as an example of a vehicle speed detection unit, and the shift position sensor 184 functions as an example of a shift position detection unit.

The ECU 172 takes up the webbing 14 by controlling actuation of the motor 48 based on the signals input from the various detection unit such as the buckle switch 174, the door switch 178, the seat switch 180, the vehicle speed sensor 182, and the shift position sensor 184.

Note that the ECU 172 uses the buckle switch 174 to confirm whether or not there is a state in which the webbing 14 is being worn by the occupant. The ECU 172 also uses the door switch 178 and the seat switch 180 to confirm whether or not the occupant is sitting in the seat, and whether or not the occupant is expected to move their body. The ECU 172 also uses the vehicle speed sensor 182 and the shift position sensor 184 to confirm whether or not the vehicle 12 has started travelling forward, or whether or not a state for starting forward travel has been reached. Once the ECU 172 confirms, for example, that the occupant is in a seated state in the seat and has a low probability of moving their body, the ECU 172 uses the buckle switch 174 to confirm whether or not the occupant is wearing the webbing 14. The ECU 172 also, for example, takes up the webbing 14 in order to bring the webbing 14 into firm contact with the occupant in a case in which the occupant is in a state wearing the webbing 14, and in a case in which the vehicle 12 is in a state for starting forward travel or has started travelling forward. In the following explanation, using the motor 48 to take up the webbing 14 to bring it into firm contact with the occupant is referred to as "fitting assist".

In a case in which the ECU 172 has confirmed, using the buckle switch 174, that the vehicle 12 has stopped and the occupant has released the engagement between the tongue 24 and the buckle 30 in order to alight, the ECU 172 drives the motor 48 such that the webbing 14 that has been pulled out from the spool 40 for wearing is wound back onto the spool 40 and stored. In the following explanation, using the motor 48 to take up the webbing 14 onto the spool 40 to be stored is referred to as "storage assist".

The controller 170 is provided with a current sensor 186 that detects the current driving the motor 48. The current sensor 186 is connected to the ECU 172, and the output torque of the motor 48 is controlled by reading the current of the motor 48 detected by the current sensor 186 and controlling the output electrical power (for example, an output voltage) so as not to exceed a preset current value. In the first exemplary embodiment, as an example, the current sensor 186 is provided separately to the ECU 172; however, there is no limitation thereto, and the ECU 172 may be configured including the function of the current sensor 186.

The webbing take-up device 16 includes the drive force transmission mechanism 60 that, in a case in which the motor 48 rotates forward, transmits the rotation force of the motor 48 to the spool 40 and rotates the spool 40 in the take-up direction. The webbing take-up device 16 is also provided with the drive force transmission mechanism 100 that, in a case in which the motor 48 rotates in reverse, transmits the rotation force of the motor 48 to the spool 40 and rotates the spool 40 in the take-up direction. In the webbing take-up device 16, the drive force transmission mechanism 60 is employed when performing fitting assist, and the drive force transmission mechanism 100 that limits the take-up torque of the spool 40 is employed when performing storage assist.

The ECU 172 of the webbing take-up device 16 drives the motor 48 to rotate forward when performing fitting assist, and limits the output torque of the motor 48 by limiting the drive current of the motor 48, thereby limiting the take-up torque of the spool 40. The ECU 172 rotates the motor 48 in reverse when performing storage assist, and limits the rotation speed of the output shaft 48A of the motor 48 by limiting the drive voltage of the motor 48, thereby limiting the take-up speed of the webbing 14 by the spool 40, namely, limiting the movement speed of the webbing 14 onto the spool 40. Since storage assist can be performed employing the drive force transmission mechanism 100 in the webbing take-up device 16, the take-up torque of the spool 40 during storage assist is limited by the clutch mechanism 122 of the drive force transmission mechanism 100.

In the seatbelt device 10 according to the first exemplary embodiment, the load that the occupant receives from the webbing 14 in a case in which the webbing 14 is in firm contact with the occupant is set, and the take-up torque of the spool 40 is limited based on the set load. Namely, in order to obtain a high occupant restraint performance from the webbing 14, the webbing 14 is pulled tightly such that what is known as "slack" does not arise, thus requiring a large take-up torque of the spool 40. However, if the take-up torque of the spool 40 is too large, the occupant receives a large load, causing discomfort to the occupant.

Accordingly, in the seatbelt device 10, for example, when performing fitting assist such that the webbing 14 contacts the occupant firmly, the load that the webbing 14 applies to the occupant (for example an upper load limit) is set based on occupant restraint performance and sensory evaluation. In the webbing take-up device 16, an upper limit of the take-up torque of the spool 40 is determined based on the set load, and the output torque of the motor 48 is set based on the upper limit determined for the take-up torque. The ECU 172 of the webbing take-up device 16 is set with a limit value (limit current $I_F$) for a drive current I with respect to a drive voltage V of the motor 48 when performing fitting assist based on the take-up torque of the spool 40.

In a state in which fitting assist has been completed, it is possible that the occupant could be caused discomfort, for example, an oppressive feeling, if a large biasing force were applied in order to prevent slack from arising in the webbing 14 worn by the occupant.

Accordingly, in the seatbelt device 10, the tension of the webbing 14 is set based on sensory evaluation, so as not to feel oppressive to the occupant wearing the webbing 14 (so as not to cause discomfort such as an oppressive feeling). In the webbing take-up device 16, the biasing force of the take-up spring 112 is determined based on the tension that has been set.

Moreover, in a case in which wearing has been released, it is not desirable for the speed with which the webbing 14 is taken up onto the spool 40 (the movement speed of the webbing 14) to be too fast or too slow, as the movement speed affects the take-up time of the webbing 14. If the tension applied to the webbing 14 when wearing has been released is too large, the webbing 14 and the tongue 24 are pulled with a greater tension than necessary, which is not desirable. Tension sufficiently lower than the tension for placing the webbing 14 in firm contact with the occupant is desirable.

Accordingly, in the seatbelt device 10, the movement speed, take-up time, and tension of the webbing 14 are set in advance through testing or the like, so as to enable trouble-free and smooth storage of the webbing 14. In order to achieve this, the tension is set sufficiently lower than the tension when placing the webbing 14 in firm contact with the occupant.

In the ECU 172 of the webbing take-up device 16, an actuation time of the motor 48 is set based on the take-up time set for the seatbelt device 10, and a voltage $V_T$ of the drive voltage V of the motor 48 is set based on the movement speed. The voltage $V_T$ is set lower than the voltage $V_F$. In the webbing take-up device 16, the take-up torque of the spool 40 is set based on the tension set for the webbing 14, and the frictional force between the clutch gear 128 and the clutch spring 130 of the clutch mechanism 122 provided to the drive force transmission mechanism 100, namely, the external diameter and biasing force of the clutch spring 130, are set so as to obtain the set take-up torque.

In the ECU 172, the drive voltage V is set by the preset voltage $V_F$ (for example, $V_F=12V$), and the motor 48 is supplied with the drive voltage V so as to rotate forward, thereby initiating fitting assist. The ECU 172 also, for example, detects the drive current I of the motor 48 using the current sensor 186, and stops actuation of the motor 48 to end fitting in a case in which the detected drive current I reaches the limit current $I_F$ ($I \geq I_F$). Note that the ECU 172 may rotate the motor 48 forward for a predetermined actuation duration at the predetermined drive voltage V ($V=V_F$), and control the drive voltage V such that the drive current I is the limit current $I_F$ or below ($I \leq I_F$) during actuation of the motor 48.

Accordingly, in the webbing take-up device 16, the take-up torque of the spool 40 is limited, enabling high occupant restraint performance to be obtained without imparting a load that would cause discomfort to the occupant wearing the webbing 14. The webbing take-up device 16 also enables an occupant restraint state to be maintained in a state that does not impart an oppressive feeling to the occupant after fitting assist has been completed.

The ECU 172 moreover sets the drive voltage V to the preset voltage $V_T$, and rotates the motor 48 in reverse at the set drive voltage V ($V=V_T$) for a predetermined actuation duration to take up the webbing 14 onto the spool 40. Note that in the drive force transmission mechanism 100, the clutch mechanism 122 suppresses take-up torque exceeding the tension set for the webbing 14 from arising in the spool 40. Accordingly, in the webbing take-up device 16, the webbing 14 and the tongue 24 are moved smoothly and stored without causing tension exceeding the set tension to arise in the webbing 14.

In the vehicle 12, sometimes a child seat (not illustrated in the drawings), this being an infant assistance device, may be attached to seats 28 other than the driving seat (the front passenger seat and rear seats). Generally, child seats are retained on the seat 28 using the webbing 14. Accordingly, in cases in which a child seat is fitted, it is preferable that the seatbelt device 10 maintains a restrained state of the child seat by the webbing 14 when in a state in which the tongue 24 is engaged with the buckle 30, regardless of whether the door 176 of the vehicle 12 is open or closed.

Accordingly, as illustrated in FIG. 4, the seatbelt device 10 is provided with a selection switch 188. The selection switch 188 is connected to the ECU 172 of the controller 170. The selection switch 188 is disposed at a location inside the vehicle 12 (inside the vehicle compartment) where it does not attract attention and will not be operated unintentionally, for example, in the vicinity of the slip joint 20 or in the vicinity of the webbing take-up device 16.

In a case in which the selection switch 188 is operated, the ECU 172 performs preset take-up control of the webbing 14 according to the operation state of the selection switch 188. The selection switch 188 may be omitted from the seatbelt device 10 provided to the driving seat, to which child seats and the like are not attached.

Explanation follows regarding take-up of the webbing 14 by the webbing take-up device 16 using the motor 48. The seatbelt device 10, is provided with the selection switch 188 as an example, and, for example, the selection switch 188 is operated when attaching a child seat, not illustrated in the drawings, to a seat 28 other than the driving seat.

Figure 5:
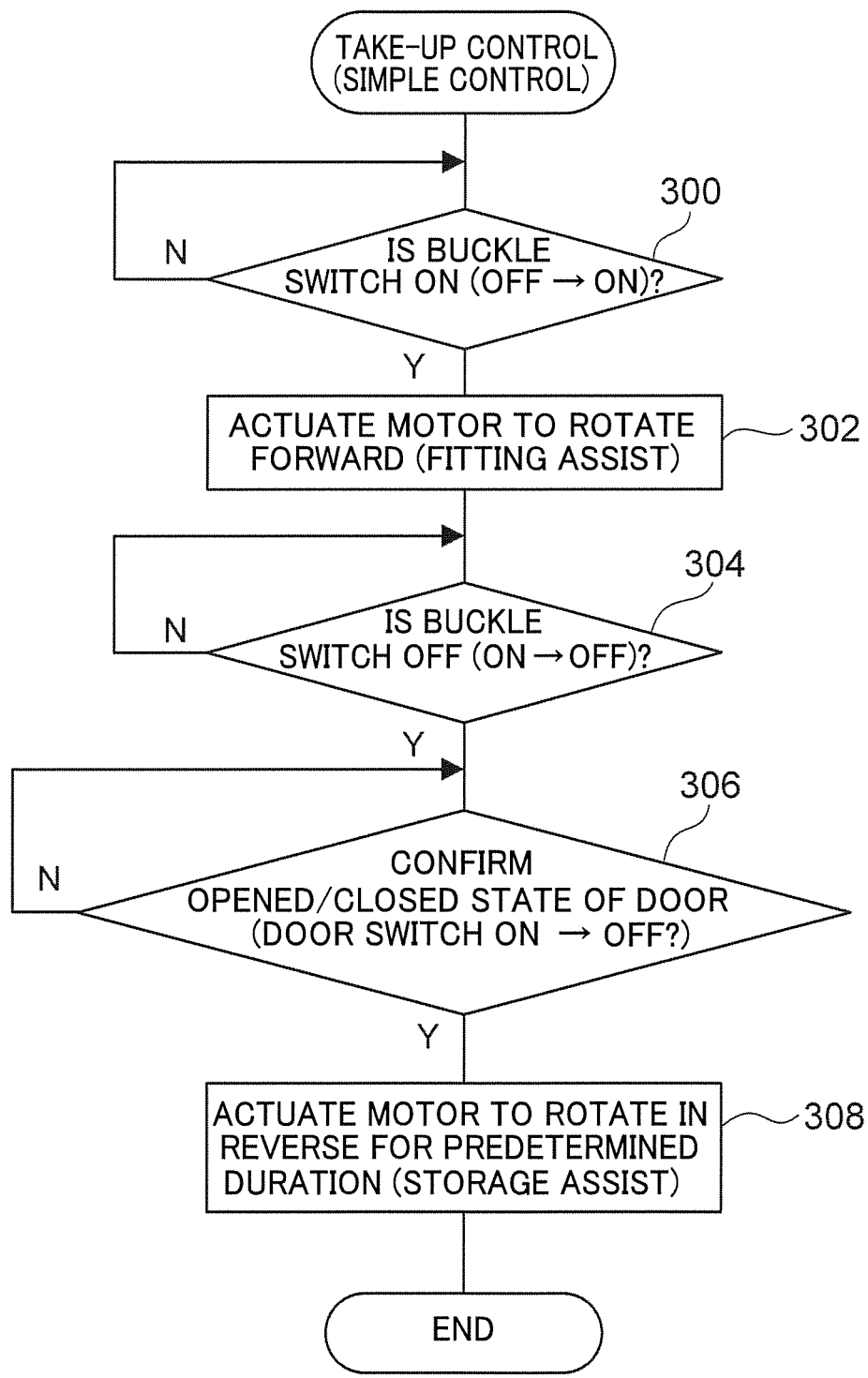
FIG. 5 is a flowchart illustrating an example of simple webbing take-up control.

FIG. 5 illustrates an example of take-up control (simple control) executed by operating the selection switch. In this flowchart, in the simple control executed by operating the selection switch 188, determination is affirmative at step 300 in a case in which the tongue 24 has been engaged with the buckle 30, thereby turning the buckle switch 174 ON, and processing transitions to step 302. At step 302, the drive voltage V of the motor 48 is set to the preset voltage $V_F$, and the motor 48 is rotated forward in order to perform fitting assist.

In the webbing take-up device 16, in a case in which the output shaft 48A of the motor 48 is rotated forward, the rotation of the output shaft 48A is transmitted to the spool 40 through the drive force transmission mechanism 60. Accordingly, in the webbing take-up device 16, the spool 40 is rotated in the take-up direction at the predetermined take-up torque, and excess length of the webbing 14 is taken up onto the spool 40. The child seat or the like is accordingly securely retained on the seat by the webbing 14. Note that fitting assist is, for example, stopped in a case in which the drive current I of the motor 48 reaches the preset limit current $I_F$.

When removing the child seat from the seat 28, the engagement between the tongue 24 and the buckle 30 is released. Due to the engagement between the tongue 24 and the buckle 30 being released, affirmative determination is made at step 304, and processing transitions to step 306. At step 306, a change in the signal of the door switch 178 is confirmed.

A change in the signal of the door switch 178 confirms whether or not the door switch has been turned OFF after having been turned ON. Namely, affirmative determination is made at step 306 due to the door switch 178 having being switched from OFF (the door 176 being closed) to ON (the door 176 being open) and then switched OFF again, or due to the door switch 178 that had been ON having been switched OFF.

In a case in which affirmative determination is made at step 306, processing transitions to step 308, and storage assist is performed. The ECU 172 sets the drive voltage V of the motor 48 to the preset voltage $V_T$, and rotates the motor 48 in reverse for the predetermined duration at a rotation speed according to the drive voltage V that has been set. In the webbing take-up device 16, in a case in which the output shaft 48A of the motor 48 is rotated in reverse, the rotation of the output shaft 48A is transmitted to the spool 40 through the drive force transmission mechanism 100. Accordingly, in the webbing take-up device 16, the spool 40 is rotated in the take-up direction at a rotation speed according to the rotation speed of the motor 48, and at a take-up torque that is set lower than the take-up torque during fitting assist.

The webbing 14 is accordingly taken up and stored on the spool 40 reliably and without trouble. Note that in the simple control, for example, confirmation of opening and closing operation of the door 176 (the processing of step 306) using the door switch 178 may be omitted.

Figure 6:
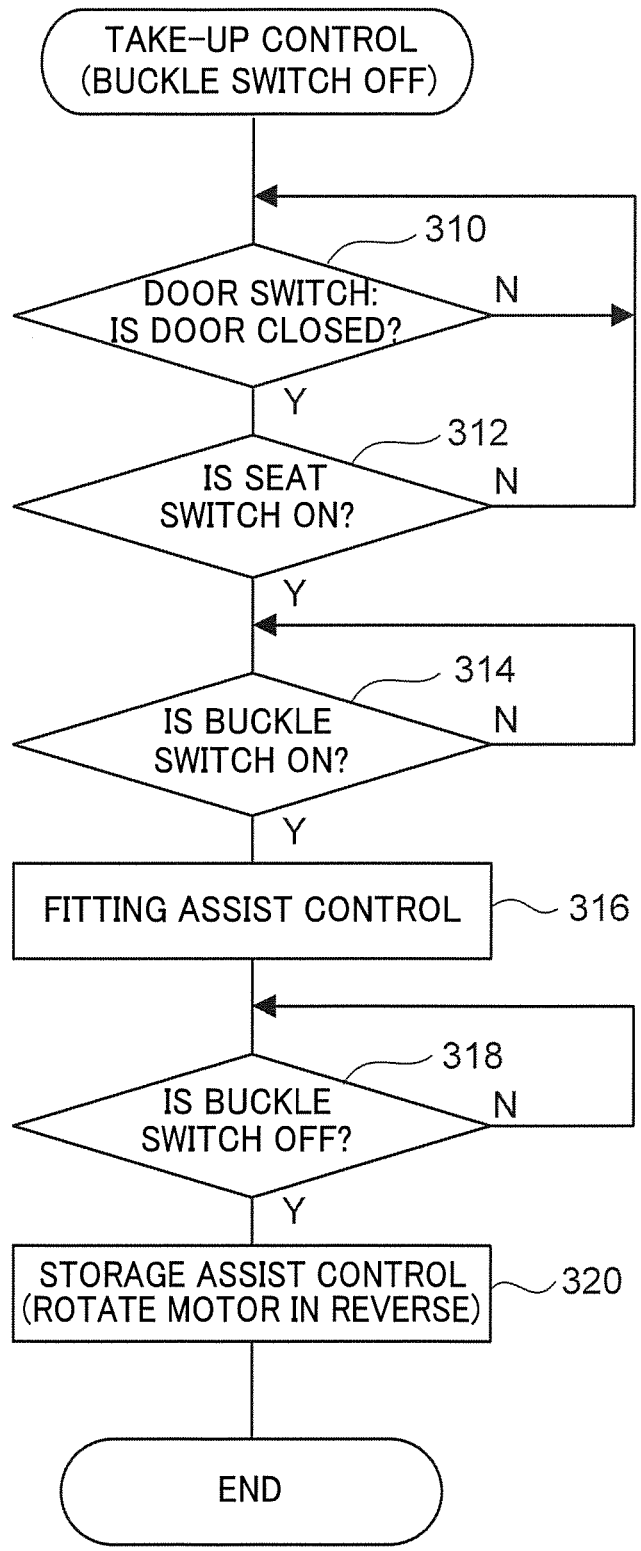
FIG. 6 is a flowchart illustrating an example of take-up control.

FIG. 6 schematically illustrates take-up control in a case in which the selection switch 188 has not been operated. Note that the take-up control illustrated in FIG. 6 is also performed in cases in which the seatbelt device 10 is not provided with the selection switch 188.

In this flowchart, at step 310 the opened/closed state of the door 176 is confirmed, and at step 312, confirmation is made as to whether or not an occupant is sitting in the seat 28. In a case in which an occupant boards the vehicle 12, the door 176 is opened and then the door 176 is closed, and the door switch 178 outputs output signals according to the opening and closing operation of the door 176. The output signal of the seat switch 180 also becomes ON by the occupant that has boarded sitting in the seat 28.

At step 310, affirmative determination is made due to the door 176 being closed, and at step 312, affirmative determination is made due to the occupant sitting in the seat 28, and processing accordingly transitions to step 314. At step 314, confirmation is made as to whether or not the buckle switch 174 is ON, and affirmative determination is made at step 314 due to the occupant wearing the webbing 14 and the tongue 24 being engaged with the buckle 30.

In a state in which the door 176 is still open when the buckle switch 174 is ON, the occupant will need to pull out the webbing 14 in order to close the door 176. Moreover, even when the buckle switch 174 is ON, it is conceivable that sometimes the occupant may not be in an appropriate seated posture due to lifting their lumbar region off the seat section 28A of the seat 28, for example. Accordingly, in the webbing take-up device 16, the door switch 178 and the seat switch 180 are employed to predict whether or not the occupant is appropriately seated. In a case in which it has been predicted that the occupant is appropriately seated, confirmation is made as to whether or not the tongue 24 has been engaged with the buckle 30, namely, whether or not the occupant is wearing the webbing 14. This thereby prevents take-up of the webbing 14 (fitting assist) from being initiated against the wishes of the occupant.

In the first exemplary embodiment, explanation has been given regarding an example in which the vehicle 12 is provided with the door switch 178 and the seat switch 180, these being connected to the ECU 172. However, configuration may be made in which at least one of the door switch 178 and the seat switch 180 is not provided. In such cases, the processing of step 310 relating to the door switch 178 and/or the processing of step 312 relating to the seat switch 180 may be omitted. Moreover, configuration may be made in which neither the door switch 178 nor the seat switch 180 are provided, and in such cases, the processing employing the door switch 178 and the seat switch 180 may be omitted.

Figure 7A:
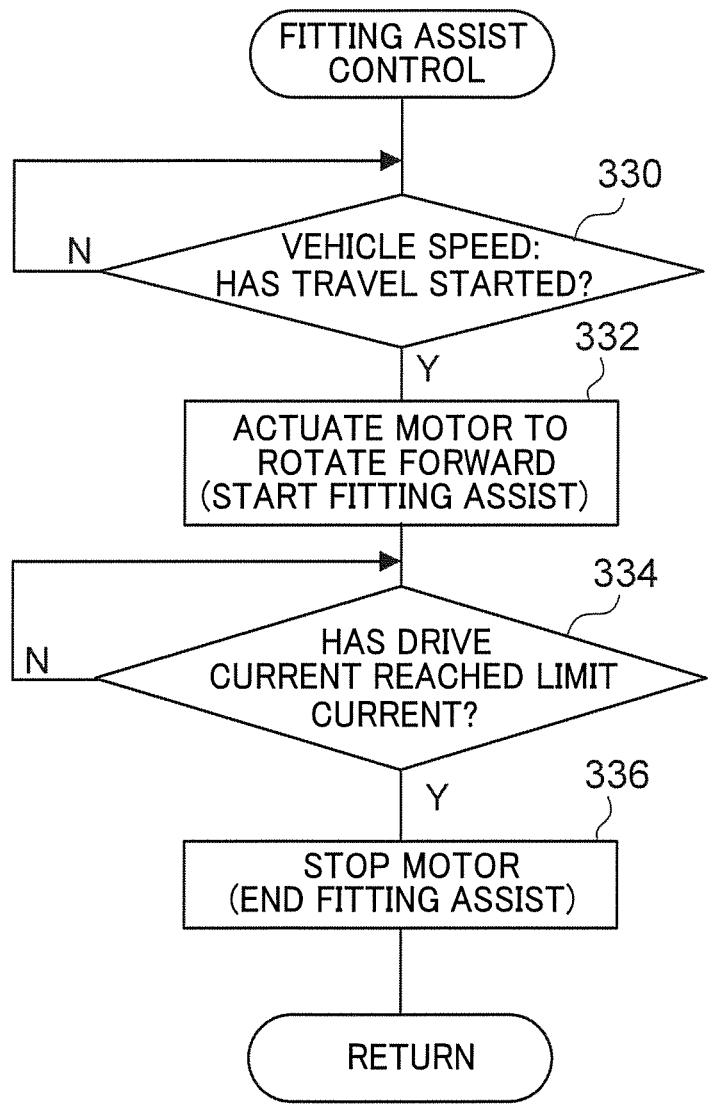
FIG. 7A is a flowchart illustrating an example of fitting assist control according to the first exemplary embodiment, illustrating a case employing a vehicle speed sensor.
Figure 7C:
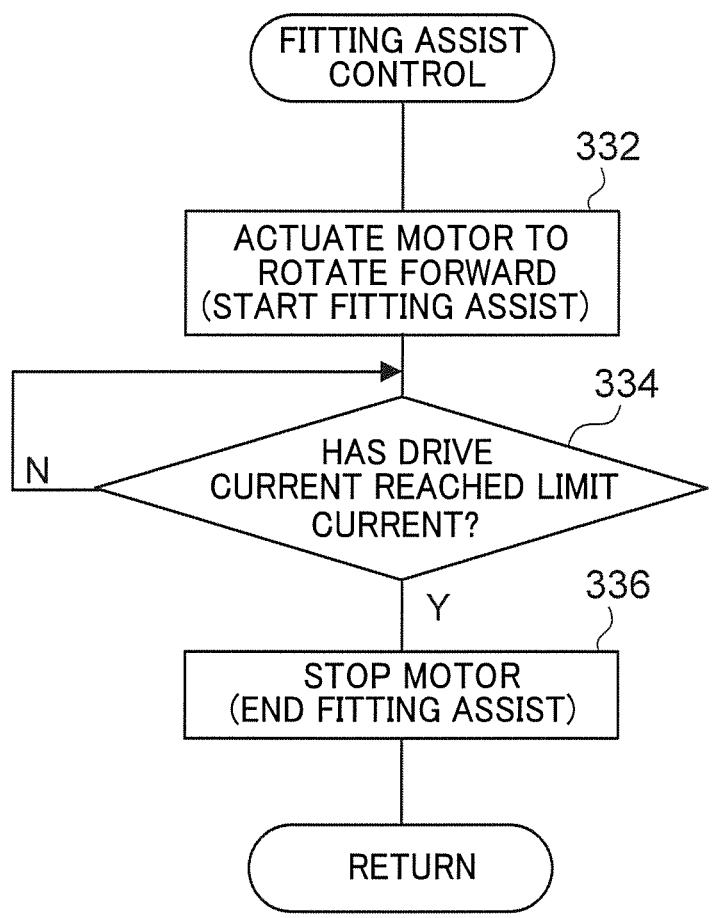
FIG. 7C is a flowchart illustrating an example of fitting assist control according to the first exemplary embodiment, illustrating a case in which a vehicle speed sensor and a shift position sensor are omitted.

In a case in which affirmative determination has been made at step 314, processing transitions to step 316, and fitting assist control to place the webbing 14 in close contact with the body of the occupant is initiated. FIGS. 7A to 7C schematically illustrate fitting assist control for performing fitting assist. In the first exemplary embodiment, as an example, the vehicle speed sensor 182 or the shift position sensor 184 is employed to confirm whether the vehicle 12 is in a state for starting forward travel, or has not yet reached a state for starting forward travel. FIG. 7A accordingly illustrates an example of processing employing the vehicle speed sensor 182, and FIG. 7B illustrates an example of processing employing the shift position sensor 184.

The fitting assist control is performed once it has been confirmed that the tongue 24 is engaged with the buckle 30, and that the occupant is wearing the webbing 14. In the fitting assist control illustrated in FIG. 7A, at the first step 330, the vehicle speed v output from the vehicle speed sensor 182 is read, and confirmation is made as to whether or not the vehicle speed v exceeds a preset speed vs. A preset speed such as vs=0 km/h, vs=5 km/h, or vs=10 km/hour is applied as the speed vs (for example, vs=10 km/h).

In a case in which the vehicle 12 moves forward and the vehicle speed v exceeds the speed vs (v>vs), determination is affirmative at step 330, and processing transitions to step 332, where the drive voltage V is set to the voltage $V_F$, and the motor 48 is operated so as to rotate forward at the set drive voltage V. The rotation force of the output shaft 48A of the motor 48 is transmitted to the spool 40 through the drive force transmission mechanism 60, and the spool 40 is rotated in the take-up direction, thereby starting take-up (fitting assist) of the webbing 14.

Then, at step 332, confirmation is made as to whether or not the drive current I of the motor 48 detected by the current sensor 186 has reached the preset limit current $I_F$. In a case in which the drive current I has reached the limit current $I_F$ ($I \geq I_F$) and determination is affirmative at step 332, processing transitions to step 334, and the motor 48 is stopped, ending fitting assist.

By performing fitting assist in this manner, the webbing 14 is placed in firm contact with the body of the occupant, enabling reliable occupant protection. Since the limit current $I_F$ is set based on a tension (take-up torque of the spool 40) at which the webbing 14 does not cause the occupant discomfort, an uncomfortable load is not applied to the occupant. Due to stopping the motor 48, the webbing 14 is applied with the biasing force of the take-up spring 112, so as not to cause the occupant wearing the webbing 14 to experience an oppressive feeling or the like.

In the fitting assist control illustrated in FIG. 7B, at the first step 338, the position of the shift gear detected by the shift position sensor 184 is read, and confirmation is made as to whether or not the position of the shift gear is in a D range for moving the vehicle 12 forward, or a position corresponding to a D range for moving the vehicle 12 in a forward direction.

Note that in a vehicle 12 provided with automatic transmission, negative determination is made at step 338 in a case in which the shift gear position corresponds to non-forward travel such as a "P range", an "N range", or an "R range" (an "N position" and an "R position" in the case of a vehicle 12 with manual transmission). However, affirmative determination is made at step 338 when at a position corresponding to forward travel of the vehicle 12 such as the "D range", an "L range", or a "2nd gear range". In a case in which determination is affirmative at step 338, processing transitions to step 332 and the motor 48 rotates forward to perform fitting assist.

In this manner, fitting assist is performed in a case in which the vehicle 12 starts to travel, or is in a state where travel can begin, thereby suppressing, for example, the webbing 14 of the seatbelt device 10 from unnecessarily restraining the occupant or causing the occupant discomfort due to preventing intentional movement of the occupant in a case in which the occupant attempts to move around in the vehicle compartment with the vehicle 12 in a stationary state.

In the first exemplary embodiment, either the vehicle speed sensor 182 or the shift position sensor 184 is employed; however, both the vehicle speed sensor 182 and the shift position sensor 184 may be employed. In such cases, fitting assist may be started in a case in which at least one sensor is in an ON state. This thereby enables the webbing 14 to be placed in a secure occupant restraint state if, for example, the vehicle 12 starts to move with the shift lever in the N range.

Moreover, when performing fitting assist, confirmation as to whether or not the vehicle 12 has reached a state in which it can travel may be made employing a parking brake switch or the like, instead of the vehicle speed sensor 182 or the shift position sensor 184.

In the webbing take-up device 16, configuration may be made in which neither the vehicle speed sensor 182 nor the shift position sensor 184 is connected to the ECU 172. FIG.

7C illustrates an example of fitting assist control in such a case. In the flowchart illustrated in FIG. 6, confirmation that the occupant is wearing the webbing 14 is made in a case in which the buckle switch 174 is switched ON. Accordingly, in FIG. 7C, step 332 is executed in a case in which transition is made to fitting assist control to start forward rotation operation of the motor 48.

As illustrated in FIG. 6, processing transitions to step 318 on completion of fitting assist control. At step 318, confirmation is made as to whether or not the occupant has released the engaged state between the tongue 24 and the buckle 30 in order to release the worn state of the webbing 14.

Affirmative determination is made at step 318 and processing transitions to step 320 in a case in which the engaged state between the tongue 24 and the buckle 30 is released, and storage assist control is performed to take up and store the webbing 14. In the storage assist control, the drive voltage V is set to the preset voltage $V_T$, and the motor 48 is rotated in reverse for a preset duration at the set drive voltage V ($V=V_T$). The rotation force of the output shaft 48A of the motor 48 is accordingly transmitted to the spool 40 through the drive force transmission mechanism 100, and the spool 40 rotates in the take-up direction and takes up and stores the webbing 14.

The drive force transmission mechanism 100 is provided with the clutch mechanism 122. The clutch mechanism 122 slips in a case in which the spool 40 reaches a preset take-up torque or greater. The spool 40 accordingly takes up the webbing 14 in a state in which the take-up torque is limited. The spool 40 is rotated at a rotation speed according to the drive voltage V of the motor 48, such that the webbing 14 and the tongue 24 move without trouble in a case in which the webbing 14 is being taken up onto the spool 40.

Note that storage assist control may be set with conditions for performing storage assist. Such conditions may include at least one out of operation of the seat switch or the door switch. In such cases, for example, the motor 48 may be actuated to rotate in reverse for storage assist by detecting that the occupant has alighted (that the seat switch 180 is OFF), and that the door 176 has been closed (that the output signal of the door switch 178 has changed from ON to OFF). Conditions for performing storage assist may also include, for example, detection results of the vehicle speed sensor 182 and the shift position sensor 184. For example, in such cases, the vehicle 12 being stationary (vehicle speed v=0 km/h), and the shift lever position being in the "P range" may be included as respective conditions for starting storage assist.

Moreover, in storage assist, in cases in which the current value detected by the current sensor 186 reaches the preset upper limit value within a preset actuation duration, determination may be made that storage of the webbing 14 has not been fully completed, and a retry operation may be performed. The storage assist retry operation is performed plural times at preset intervals, with the motor 48 being forward rotated in a state in which a larger output torque is obtained than during reverse rotation. This thereby enables the webbing 14 to be reliably taken-up and stored.

Second Exemplary Embodiment

Next, explanation follows regarding a second exemplary embodiment. Note that the basic configuration of the second exemplary embodiment is similar to that of the first exemplary embodiment described above. In the second exemplary embodiment, functional components equivalent to those of the first exemplary embodiment are allocated the same reference numerals as in the first exemplary embodiment, and detailed explanation thereof is omitted.

Figure 8:
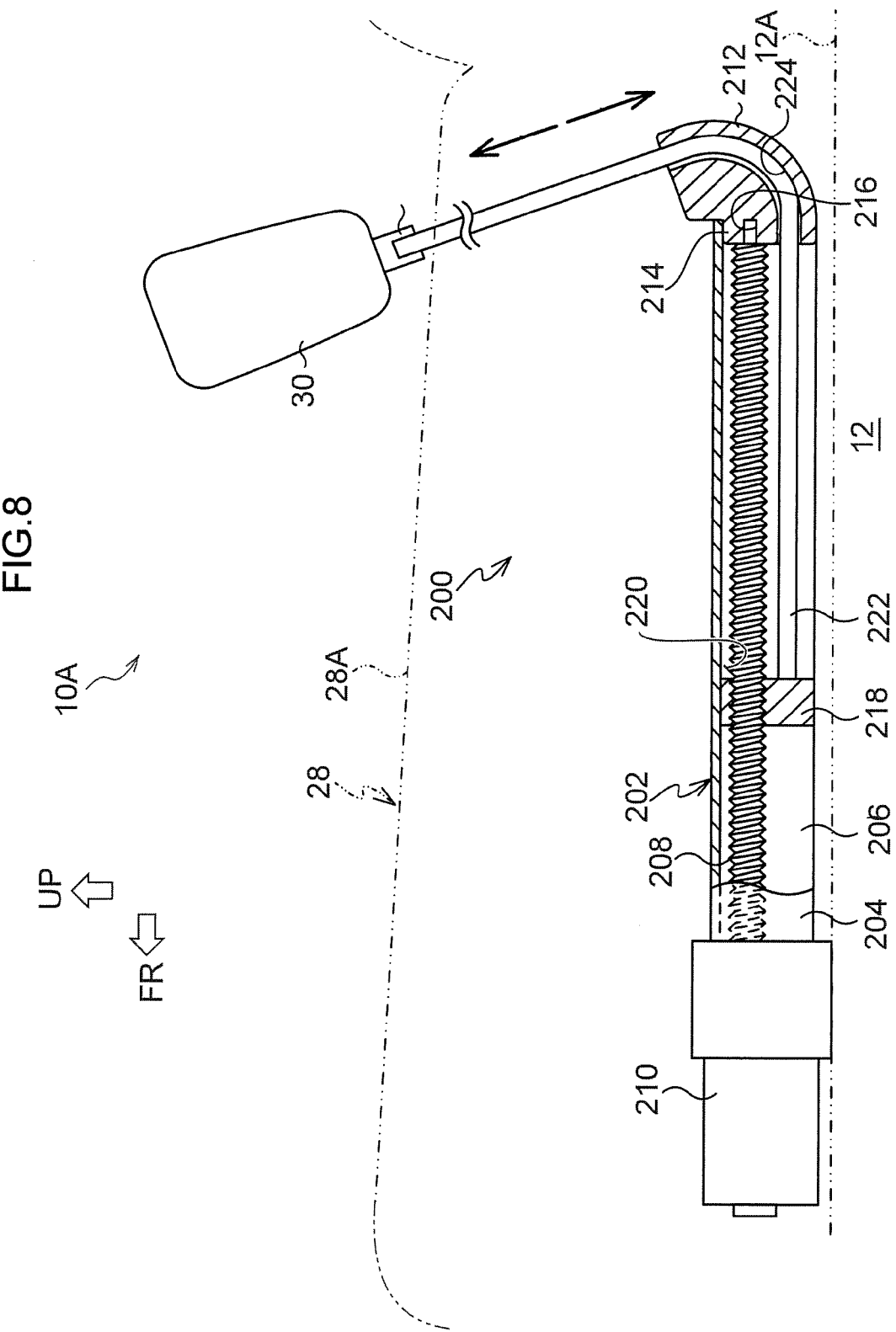
FIG. 8 is a schematic configuration diagram illustrating an example of a buckle device according to a second exemplary embodiment.

FIG. 8 illustrates a buckle device 200 provided to a seatbelt device 10A according to the second exemplary embodiment. In the second exemplary embodiment, the buckle device 200 is provided in place of the buckle device 26 according to the first exemplary embodiment. The seatbelt device 10A differs from the seatbelt device 10 of the first exemplary embodiment in the point that it includes the buckle device 200.

The buckle device 200 includes a frame 202. The frame 202 is disposed at a vehicle width direction inside (the near side of the page in FIG. 8) of the seat section 28A of the seat 28 that is provided as a front seat of the vehicle 12, for example, and is fixed to a floor face 12A of the vehicle body. The frame 202 includes a pair of guide walls 204, 206 that face each other along the vehicle width direction, and a feed screw 208 provided between the guide wall 204 and the guide wall 206. The feed screw 208 has an elongated circular rod shape, is formed with a male thread at an outer peripheral portion, and forms a feed screw mechanism. The feed screw 208 is disposed with its axial direction running along the vehicle front-rear direction.

A motor 210, functioning as an example of a drive unit, is disposed at a vehicle front side end portion between the guide walls 204, 206. A drive shaft of the motor 210, not illustrated in the drawings, extends toward the vehicle rear side, and the drive shaft is coupled to a vehicle front side end portion of the feed screw 208.

A wire guide 212 is provided at a vehicle rear side end portion of the frame 202. An insertion portion 214 is formed at a vehicle front side end portion of the wire guide 212, and the insertion portion 214 is fixed to the frame 202 by fitting into the frame 202 from the vehicle rear side. The wire guide 212 is formed with a shaft bearing hole 216 at a vehicle front side end face of the insertion portion 214. A vehicle rear side leading end portion of the feed screw 208 is inserted into and rotatably supported by the shaft bearing hole 216 of the wire guide 212.

In the buckle device 200, a slider 218 is disposed between the guide walls 204, 206. The slider 218 is, for example, formed in a rectangular block shape, and is capable of moving along the vehicle front-rear direction between the guide walls 204, 206 in a state in which rotation about an axis in the vehicle front-rear direction is prevented. The slider 218 is formed with a threaded hole 220. The threaded hole 220 is provided with a female thread that is carved into a through hole formed in the slider 218 so as to correspond to the feed screw 208. The feed screw 208 is screwed together with the threaded hole 220 to couple the slider 218 to an axial direction intermediate portion of the feed screw 208. The slider 218 accordingly moves along the vehicle front-rear direction between the guide walls 204, 206 in a case in which the feed screw 208 is driven to rotate.

The buckle device 200 includes a wire rope 222 serving as a support member. An end face of the wire guide 212 on the opposite side to the insertion portion 214 is curved toward the top of the vehicle. The wire guide 212 is formed with a guide groove 224 that opens below the shaft bearing hole 216 at a vehicle front side end face of the insertion portion 214 on one end side, and that curves in a circular arc shape so as to open onto an end face that faces upward in the vehicle vertical direction at the other end. Note that a configuration may be applied in which the wire guide 212 is formed with the guide groove 224 at one vehicle width direction side face, and the guide groove 224 is closed off by a cover, not illustrated in the drawings, in a state in which a length direction intermediate portion of the wire rope 222 is housed inside the guide groove 224. There is no limitation thereto, and the wire guide 212 may have a configuration in which the guide groove 224 is formed as a through hole curving in a circular arc shape inside the block shape.

A length direction intermediate portion of the wire rope 222 is in an inserted state in the guide groove 224 of the wire guide 212, and one length direction end of the wire rope 222 extends out toward the vehicle front side and is coupled to the slider 218 between the guide walls 204, 206. The other length direction end of the wire rope 222 extends out in a straight line from the wire guide 212 toward the top of the vehicle. The portion of the wire rope 222 extending out in a straight line from the wire guide 212 toward the top of the vehicle functions as the arm 32 (see FIG. 1), and the buckle 30 is attached to a leading end portion thereof.

Accordingly, the slider 218 of the buckle device 200 moves along the vehicle front-rear direction in a case in which the motor 210 is actuated and the feed screw 208 rotates. Moreover, in a case in which the slider 218 of the buckle device 200 moves along the vehicle front-rear direction, the buckle 30 fixed to the leading end portion of the wire rope 222 moves along the vertical direction (the arrow I direction and the arrow J direction). In the following explanation, as an example, the rotation direction of the motor 210 that moves the buckle 30 upward (in the arrow I direction) is referred to as the forward rotation direction, and the rotation direction of the motor 210 that moves the buckle 30 downward (in the arrow J direction) is referred to as the reverse rotation direction.

Figure 9:
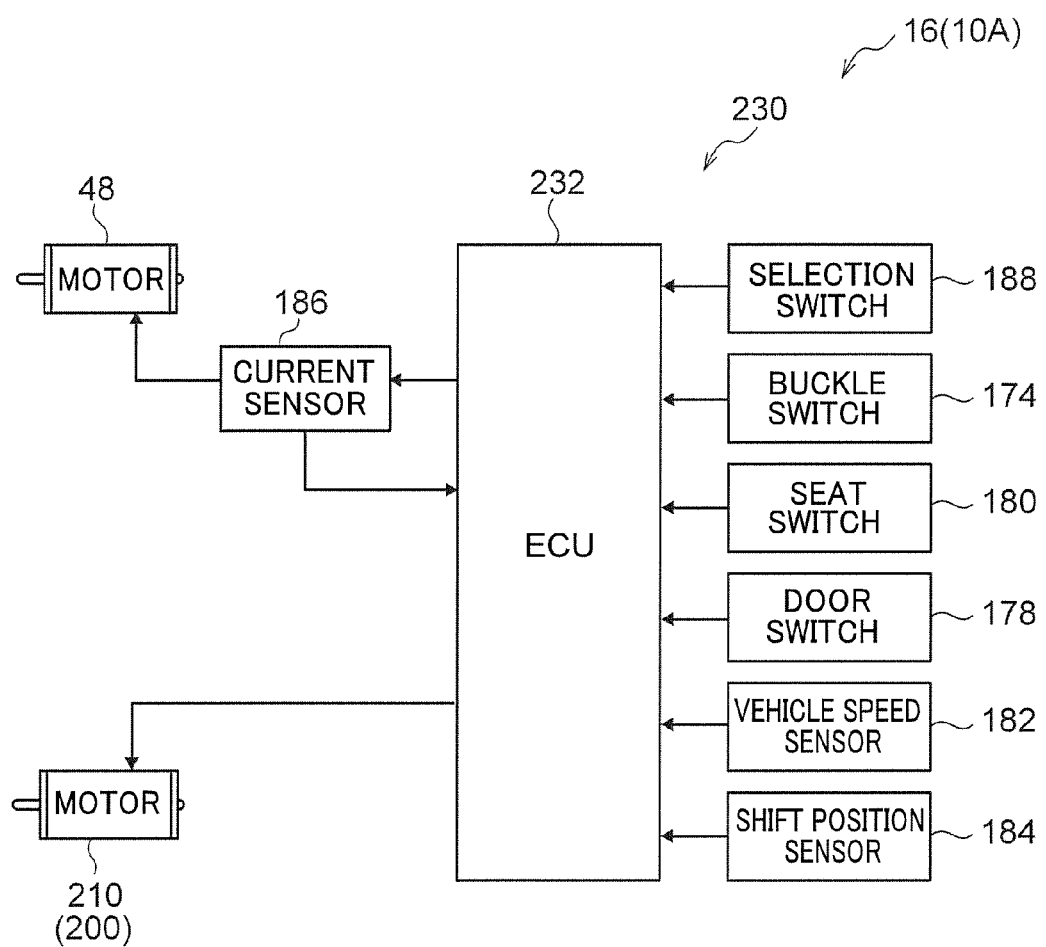
FIG. 9 is a block diagram illustrating relevant portions of an example of a controller of a webbing take-up device according to the second exemplary embodiment.

FIG. 9 illustrates a controller 230 of the seatbelt device 10A according to the second exemplary embodiment. The controller 230 includes an ECU 232. The motor 210 of the buckle device 200 is connected to the ECU 232. In addition to the functions of the ECU 172 described above, the ECU 232 has a function of controlling the motor 210 in order to raise and lower the buckle 30 of the buckle device 200 (referred to below as "lift up control").

For example, in a case in which the ECU 232 drives the motor 210 forward, the buckle 30 is raised to an attachment and detachment position of the tongue 24, this being a position set higher than the seat face of the seat section 28A. The ECU 232 also drives the motor 210 in reverse to lower the buckle 30 from a state in the attachment and detachment position to a preset stowed position that is lower than the seat face of the seat section 28A. The ECU 232 controls actuation of the motor 210 so as to move the buckle 30 over a range between the attachment and detachment position and the stowed position, while identifying the movement position of the buckle 30 by counting the number of revolutions or measuring the rotation angle of the motor 210. In a case in which this is performed, the buckle 30 is prevented from being raised more than necessary and being lowered more than necessary by, for example, providing detection unit such as limiting switches to vehicle front side end portions and vehicle rear side end portions of the guide walls 204, 206 and limiting the movement range of the slider 218.

A known configuration may be applied for the lift up mechanism and control of the buckle 30, and detailed explanation thereof is omitted in the second exemplary embodiment. In the second exemplary embodiment, the ECU 232 controls actuation of the buckle device 200; however, an ECU for actuating the buckle device 200 may be provided separately, and the ECU 232 may be configured to acquire the movement position of the buckle 30 from the ECU of the buckle device 200.

Figure 10A:
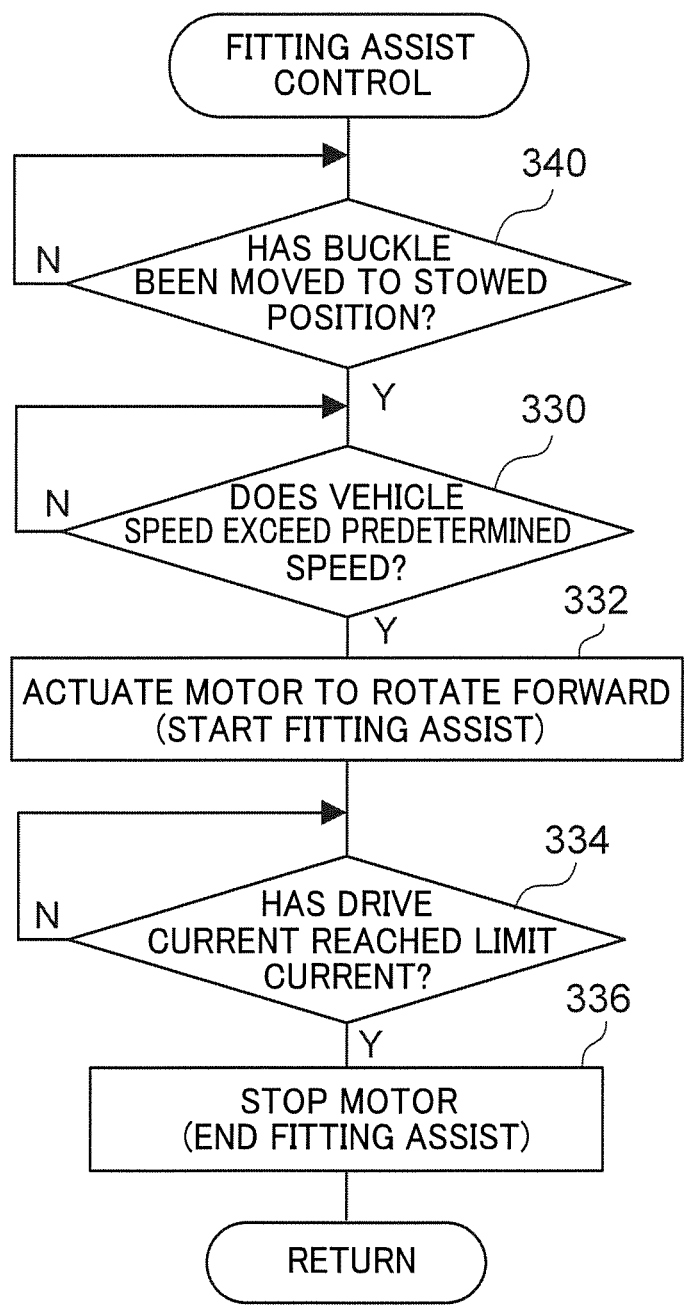
FIG. 10A is a flowchart illustrating an example of fitting assist control according to the second exemplary embodiment, illustrating a case employing a vehicle speed sensor.
Figure 10B:
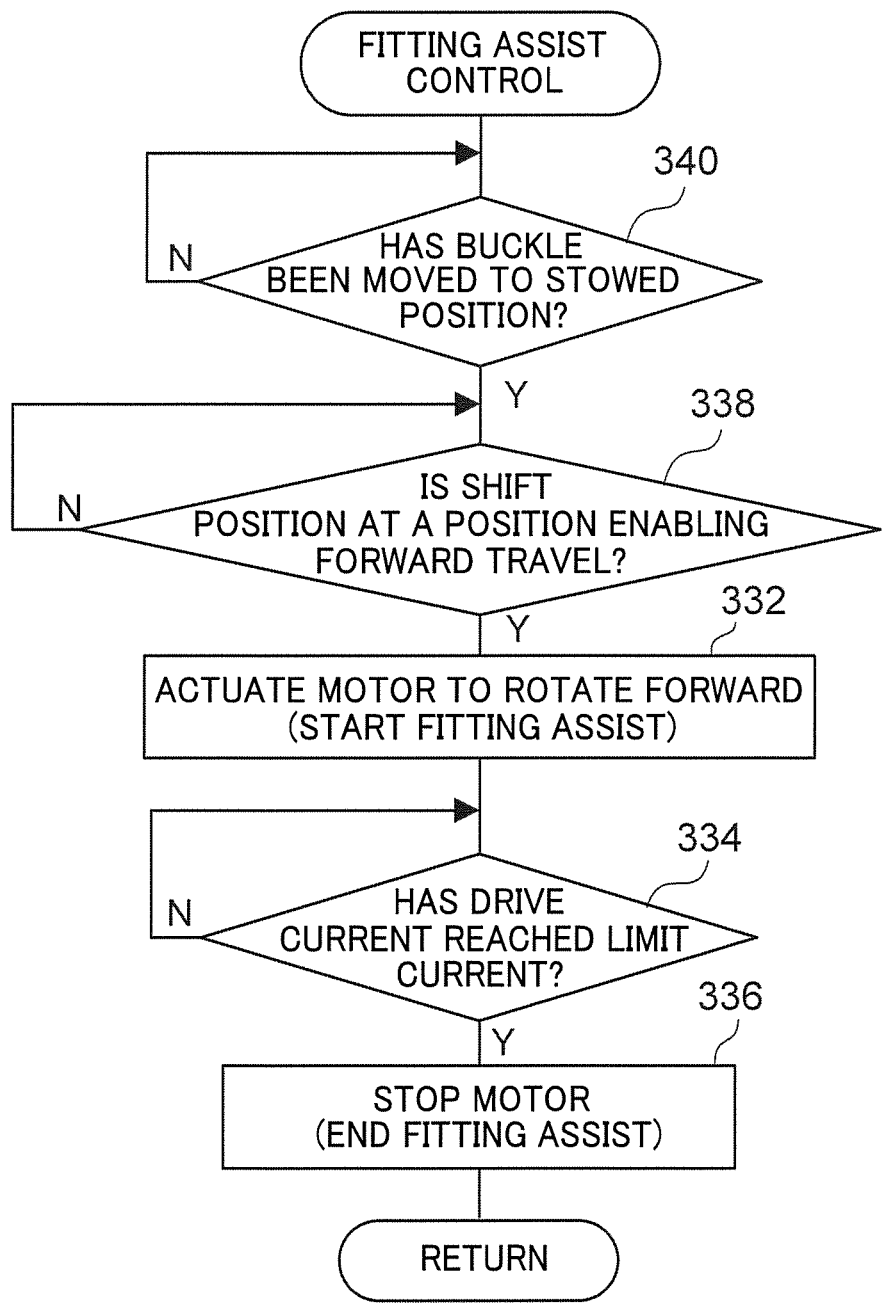
FIG. 10B is a flowchart illustrating an example of fitting assist control according to the second exemplary embodiment, illustrating a case employing a shift position sensor.
Figure 10C:
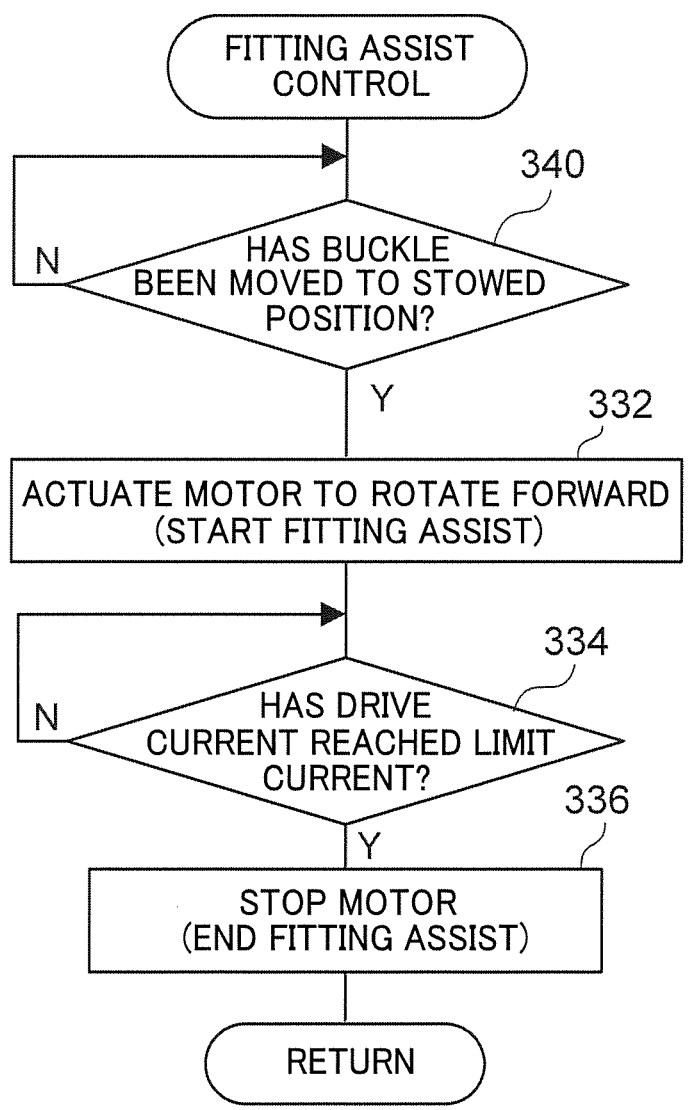
FIG. 10C is a flowchart illustrating an example of fitting assist control according to the second exemplary embodiment, illustrating a case in which a vehicle speed sensor and a shift position such are omitted.

FIG. 10 schematically illustrate fitting assist control according to the second exemplary embodiment. The second exemplary embodiment employs the buckle device 200 provided with the lift up mechanism of the buckle 30. Accordingly, the flowcharts illustrated in FIG. 10A, FIG. 10B, and FIG. 10C differ from the flowcharts illustrated in FIG. 7A, FIG. 7B, and FIG. 7C described above in the point that they include actuation of the buckle device 200. Note that FIG. 10A employs the vehicle speed sensor 182, and FIG. 10B employs the shift position sensor 184. FIG. 10C illustrates an example in which neither the vehicle speed sensor 182 nor the shift position sensor 184 is employed.

In cases in which the buckle device 200 is provided, at the first step 340, confirmation is made as to whether or not the buckle 30 has been moved to and stored in the stowed position. In a case in which the buckle 30 that has been engaged with the tongue 24 has been moved to the stowed position, one condition for performing fitting assist has been satisfied, and so affirmative determination is made at step 340.

In the buckle device 200 provided with the lift up mechanism of the buckle 30, the movement direction of the buckle 30 that is engaged with the tongue 24 from the attachment and detachment position to the stowed position is the pull-out direction of the webbing 14. Accordingly, if fitting assist was performed before moving the buckle 30 to the stowed position, it is possible that the occupant could be strapped too tightly by the webbing 14 in a case in which the buckle 30 moves to the stowed position.

Accordingly, in the second exemplary embodiment, fitting assist is performed after waiting for the buckle 30 to be moved to the stowed position. This thereby reliably prevents the occupant from being strapped more tightly than necessary by the webbing 14.

Performing fitting assist in this manner enables the webbing 14 to be placed in firm contact with the body of the occupant, thereby enabling reliable occupant protection. In a case in which the motor 48 is stopped, the webbing 14 is applied with biasing force by the take-up spring 112, such that the webbing 14 does not cause an oppressive feeling in the occupant wearing the webbing 14.

Note that the exemplary embodiments described above (the first and second exemplary embodiments) are examples, and the configuration of the present disclosure is not limited thereto. In the present exemplary embodiment, the drive force transmission mechanism 60 provided with the clutch mechanism 82 is employed as the first transmission unit, and the clutch mechanism 122 is employed as the second transmission unit; however, the configurations of the first and the second transmission unit are not limited thereto. The first transmission unit may be applied with any configuration as long as it is a configuration that transmits rotation of the output shaft in a first direction to the take-up shaft, and that rotates the take-up shaft in the take-up direction. The second transmission unit may be applied with any configuration as long as it is a configuration that transmits rotation of the output shaft in a second direction to the take-up shaft, and that rotates the take-up shaft in the take-up direction, and that also transmits the output torque of the output shaft to the take-up shaft within a range in which the take-up torque of the take-up shaft does not reach a preset first torque.

What is claimed is:
1. A webbing take-up device comprising:
 a take-up shaft to which a base end of an occupant restraint webbing is anchored, that takes up the webbing in a layered configuration by rotating in a take-up direction, and that is rotated in a pull-out direction in a case in which the webbing is pulled out;

an attachment and detachment detection unit that detects engagement and engagement release between a tongue provided at the webbing and a buckle fixed to a vehicle body;

a motor that is provided with an output shaft that is rotated in a first direction and in a second direction that is an opposite direction to the first direction, in which a rotation speed of the output shaft is controlled according to a supplied drive voltage, and an output torque of the output shaft is controlled according to a supplied drive current;

a first transmission unit that transmits rotation of the output shaft in the first direction to the take-up shaft, and that rotates the take-up shaft in the take-up direction;

a second transmission unit that transmits rotation of the output shaft in the second direction to the take-up shaft, and that rotates the take-up shaft in the take-up direction, and that also transmits the output torque of the output shaft to the take-up shaft within a range in which the take-up torque of the take-up shaft does not reach a preset first torque; and a control unit that, in a case in which engagement between the tongue and the buckle has been detected, controls the drive voltage and the drive current such that the output shaft rotates in the first direction, and the take-up torque of the take-up shaft reaches a second torque that is higher than the first torque and that is capable of obtaining a preset occupant restraint performance, and that, in a case in which release of the tongue from the buckle has been detected, controls the drive voltage such that the output shaft rotates in the second direction at a rotation speed at which the take-up shaft obtains a preset take-up speed.

2. The webbing take-up device of claim 1, further comprising a biasing member that biases the take-up shaft toward the take-up direction with a biasing force set so as not to be oppressive to an occupant restrained by the webbing.

3. The webbing take-up device of claim 1, further comprising:

a preparation detection unit that detects that preparation for restraint of the occupant with the webbing has been performed, by detecting that a door of the vehicle has been closed or by detecting that an occupant is sitting in a seat; and wherein the control unit starts control to rotate the output shaft of the motor in the first direction in a case in which engagement between the tongue and the buckle has been detected and in a state in which the preparation detection unit has detected that the preparation for restraint of the occupant with the webbing has been performed.

4. The webbing take-up device of claim 1, wherein:

at least one out of a speed detection unit that outputs a detection signal after a vehicle speed has reached a preset forward speed, or a shift position detection unit that outputs a detection signal after a shift position of a shift lever of the vehicle is placed in a forward travel position, is provided as a vehicle state detection unit; and the control unit starts control to rotate the output shaft of the motor in the first direction due to receiving a detection signal from the vehicle state detection unit in a state in which engagement between the tongue and the buckle has been detected.

5. The webbing take-up device of claim 1, wherein control to rotate the output shaft of the motor in the first direction is started in a buckle device that moves the buckle between a preset stowed position and an attachment and detachment position for engaging the tongue with the buckle due to the buckle with which the tongue has been engaged being moved to the stowed position.

6. A seatbelt device comprising:

the webbing take-up device of claim 1; and a buckle device that moves the buckle between a preset stowed position and an attachment and detachment position for engaging the tongue with the buckle;

wherein the control unit starts control to rotate the output shaft of the motor in the first direction due to the buckle with which the tongue has been engaged being moved to the stowed position.

* * * * *